United States Patent
Hosseini et al.

(10) Patent No.: US 11,659,578 B2
(45) Date of Patent: May 23, 2023

(54) TIMING CONDITIONS FOR SIDELINK FEEDBACK REPORTING

(71) Applicant: QUALCOMM Incorporated, San Diego, CA (US)

(72) Inventors: Seyedkianoush Hosseini, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 17/066,368

(22) Filed: Oct. 8, 2020

(65) Prior Publication Data

US 2021/0112574 A1    Apr. 15, 2021

(30) Foreign Application Priority Data

Oct. 9, 2019  (GR) ............................... 20190100447

(51) Int. Cl.
*H04W 72/12*  (2023.01)
*H04W 72/0446*  (2023.01)
*H04L 5/00*  (2006.01)
*H04W 8/24*  (2009.01)
*H04W 92/18*  (2009.01)

(52) U.S. Cl.
CPC ....... *H04W 72/1257* (2013.01); *H04L 5/0055* (2013.01); *H04W 8/24* (2013.01); *H04W 72/0446* (2013.01); *H04W 72/1284* (2013.01); *H04W 92/18* (2013.01)

(58) Field of Classification Search
CPC ......... H04W 52/0216; H04W 72/0446; H04W 72/1289; H04W 4/40; H04W 4/42; H04W 4/44; H04W 4/46; H04W 4/48; H04L 41/0806; H04L 41/0896; Y02D 30/70
See application file for complete search history.

(56) References Cited

U.S. PATENT DOCUMENTS

2017/0230956 A1    8/2017  Kim et al.
2018/0139747 A1    5/2018  Hosseini et al.
(Continued)

FOREIGN PATENT DOCUMENTS

WO    WO2019093816 A1    5/2019

OTHER PUBLICATIONS

Interdigital 3gpp TSF RAN WG1 #97: R1-1907096 on physical layer procedures for NR V2X sidelink May 2019 (Year: 2019).*
(Continued)

*Primary Examiner* — Rina C Pancholi
(74) *Attorney, Agent, or Firm* — Danai Nelisile Mhembere; Holland & Hart LLP

(57) ABSTRACT

Methods, systems, and devices for wireless communications are described. A base station may schedule a user equipment (UE) to transmit a sidelink data message to another UE. The base station may consider timing capabilities of the transmitting UE and the receiving UE when scheduling the sidelink communication. For example, the base station may schedule a feedback resource based on the timing capabilities of the transmitting UE and the receiving UE. The feedback resource may be scheduled with enough time such that the sidelink UEs can finish processing any sidelink communications in time to provide the feedback for the sidelink communications to the base station using the feedback resource.

30 Claims, 18 Drawing Sheets

(56) References Cited

U.S. PATENT DOCUMENTS

| | | | |
|---|---|---|---|
| 2018/0352527 A1 | 12/2018 | Wang et al. | |
| 2019/0280840 A1 | 9/2019 | Miao et al. | |
| 2020/0029318 A1* | 1/2020 | Guo | H04L 1/1819 |
| 2020/0037343 A1* | 1/2020 | He | H04W 72/0446 |
| 2020/0220694 A1* | 7/2020 | Khoryaev | H04L 1/1816 |

OTHER PUBLICATIONS

Huawei 3gpp TSG RAN WG1 #98, R1-1909315: NR DCI and UCI design for resource allocation mode 1 Aug. 2019 (Year: 2019).*

Greece Application No. 20190100447 Filed on Oct. 9, 2019.

Huawei., et al., "NR DCI and UCI Design for Resource Allocation Mode 1", 3GPP Draft, R1-1909315, 3GPP TSG RAN WG1 Meeting #98, 3rd Generation Partnership Project (3GPP), Mobile Competence Centre, 650, Route Des Lucioles, F-06921 Sophia-Antipolis Cedex, France vol. RAN WG1, No. Prague, Czech Republic, Aug. 26, 2019-Aug. 30, 2019, Aug. 17, 2019 (Aug. 17, 2019), XP051765922, 7 Pages, Retrieved from the Internet: URL:http://www.3gpp.org/ftp/tsg_ran/WG1_RL1/TSGR1_98/Docs/R1-1909315.zip [retrieved on Aug. 17, 2019] pp. 3-5.

Interdigital., et al., "On Physical Layer Procedures for NR V2X Sidelink", 3GPP Draft, 3GPP TSG RAN WG1 #97, R1-1907096, On Physical Layer Procedures for NR V2X Sidelink_Final, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728542, 9 pages, Retrieved from the Internet: URL: http://www.3gpp.org/ftp/Meetings%5F3GPP%5FSYNC/RAN1/Docs/R1%2D1907096%2Ezip. [retrieved on May 13, 2019], pp. 2-3 the whole document.

International Search Report and Written Opinion—PCT/US2020/054987—ISA/EPO—dated Jan. 25, 2021.

NTT Docomo Inc: "Uu-Based Side Link Resource Allocation/Configuration for NR V2X", 3GPP Draft, 3GPP TSG RAN WG1 Meeting #AH1901, R1-1902802_UU-Based SL Resource Alloc Config_FIN, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Feb. 16, 2019 (Feb. 16, 2019), XP051600497, 5 Pages, Retrieved from the Internet: URL:http://www.3gpp.org/ftp/tsg%5Fran/WG1%5FRL1/TSGR1%5F96/Docs/R1%2D1902802%2Ezip [retrieved on Feb. 16, 2019] pp. 1-2.

* cited by examiner

TIMING CONDITIONS FOR SIDELINK FEEDBACK REPORTING

CROSS REFERENCE

The present Application for Patent claims the benefit of Greece Provisional Patent Application No. 20190100447 by HOSSEINI et al., entitled "TIMING CONDITIONS FOR SIDELINK FEEDBACK REPORTING," filed Oct. 9, 2019, assigned to the assignee hereof, and expressly incorporated by reference herein.

INTRODUCTION

The following relates generally to wireless communications and more specifically to timing conditions relating to providing feedback.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communications is described. The method may include receiving, from a first UE, sidelink control information scheduling a sidelink data transmission, identifying, at a second UE, a timing gap based on a timing capability of the second UE, the timing gap configured between a receipt of the scheduled sidelink data transmission at the second UE and feedback from the second UE, determining whether the timing gap configured between the receipt of the sidelink data transmission at the second UE and the feedback from the second UE satisfies the timing capability of the second UE, and transmitting the feedback based on the timing gap satisfying the timing capability or detecting an error event for the feedback based on the timing gap failing to satisfy the timing capability.

An apparatus for wireless communications is described. The apparatus may include a processor, memory coupled with the processor, and instructions stored in the memory. The instructions may be executable by the processor to cause the apparatus to receive, from a first UE, sidelink control information scheduling a sidelink data transmission, identify, at a second UE, a timing gap based on a timing capability of the second UE, the timing gap configured between a receipt of the scheduled sidelink data transmission at the second UE and feedback from the second UE, determine whether the timing gap configured between the receipt of the sidelink data transmission at the second UE and the feedback from the second UE satisfies the timing capability of the second UE, and transmit the feedback based on the timing gap satisfying the timing capability or detecting an error event for the feedback based on the timing gap failing to satisfy the timing capability.

Another apparatus for wireless communications is described. The apparatus may include means for receiving, from a first UE, sidelink control information scheduling a sidelink data transmission, identifying, at a second UE, a timing gap based on a timing capability of the second UE, the timing gap configured between a receipt of the scheduled sidelink data transmission at the second UE and feedback from the second UE, determining whether the timing gap configured between the receipt of the sidelink data transmission at the second UE and the feedback from the second UE satisfies the timing capability of the second UE, and transmitting the feedback based on the timing gap satisfying the timing capability or detecting an error event for the feedback based on the timing gap failing to satisfy the timing capability.

A non-transitory computer-readable medium storing code for wireless communications is described. The code may include instructions executable by a processor to receive, from a first UE, sidelink control information scheduling a sidelink data transmission, identify, at a second UE, a timing gap based on a timing capability of the second UE, the timing gap configured between a receipt of the scheduled sidelink data transmission at the second UE and feedback to be transmitted from the second UE, determine whether the timing gap configured between the receipt of the sidelink data transmission at the second UE and the feedback to be transmitted from the second UE satisfies the timing capability of the second UE, and transmit the feedback based on the timing gap satisfying the timing capability or detecting an error event for the feedback based on the timing gap failing to satisfy the timing capability.

In some examples of the method, apparatuses, and non-transitory computer-readable medium described herein, transmitting the feedback further may include operations, features, means, or instructions for transmitting the feedback to the first UE.

Some examples of the method, apparatuses, and non-transitory computer-readable medium described herein may further include operations, features, means, or instructions for identifying a resource for transmitting the feedback based on the second UE being associated with a group of UEs.

In some examples of the method, apparatuses, and non-transitory computer-readable medium described herein, transmitting the feedback further may include operations, features, means, or instructions for transmitting the feedback to a base station on a physical uplink control channel or on a physical sidelink feedback channel.

In some examples of the method, apparatuses, and non-transitory computer-readable medium described herein, the timing capability of the second UE may be based on a minimum processing time at the second UE for a downlink shared channel.

In some examples of the method, apparatuses, and non-transitory computer-readable medium described herein, receiving the sidelink data transmission may include operations, features, means, or instructions for receiving the sidelink data transmission via a plurality of transport blocks.

Some examples of the method, apparatuses, and non-transitory computer-readable medium described herein may further include operations, features, means, or instructions for transmitting corresponding feedback for each transport block of the plurality of transport blocks.

In some examples of the method, apparatuses, and non-transitory computer-readable medium described herein, determining whether the timing gap satisfies the timing capability of the second UE further may include operations, features, means, or instructions for determining whether receipt of a latest transport block of the plurality of transport blocks satisfies the timing capability of the second UE.

Some examples of the method, apparatuses, and non-transitory computer-readable medium described herein may further include operations, features, means, or instructions for receiving an indication that an acknowledgment to a base station corresponding to the feedback may have been dropped.

Some examples of the method, apparatuses, and non-transitory computer-readable medium described herein may further include operations, features, means, or instructions for receiving an indication that an acknowledgment to a base station corresponding to the feedback may be to be transmitted by the first UE in a later uplink control channel transmission.

A method of wireless communications is described. The method may include receiving, at a first UE, downlink control information from a base station scheduling a second UE for a sidelink data transmission via a sidelink data channel, transmitting, to the second UE via a sidelink control channel, sidelink control information scheduling the sidelink data transmission to the second UE and a feedback transmission to be transmitted from the second UE, where a first timing gap is configured between receipt of the sidelink data transmission at the second UE and the feedback transmission from the second UE that is based on a timing capability of the second UE, and transmitting the sidelink data transmission to the second UE via the sidelink data channel.

An apparatus for wireless communications is described. The apparatus may include a processor, memory coupled with the processor, and instructions stored in the memory. The instructions may be executable by the processor to cause the apparatus to receive, at a first UE, downlink control information from a base station scheduling a second UE for a sidelink data transmission via a sidelink data channel, transmit, to the second UE via a sidelink control channel, sidelink control information scheduling the sidelink data transmission to the second UE and a feedback transmission to be transmitted from the second UE, where a first timing gap is configured between receipt of the sidelink data transmission at the second UE and the feedback transmission from the second UE that is based on a timing capability of the second UE, and transmit the sidelink data transmission to the second UE via the sidelink data channel.

Another apparatus for wireless communications is described. The apparatus may include means for receiving, at a first UE, downlink control information from a base station scheduling a second UE for a sidelink data transmission via a sidelink data channel, transmitting, to the second UE via a sidelink control channel, sidelink control information scheduling the sidelink data transmission to the second UE and a feedback transmission from the second UE, where a first timing gap is configured between receipt of the sidelink data transmission at the second UE and the feedback transmission to be transmitted from the second UE that is based on a timing capability of the second UE, and transmitting the sidelink data transmission to the second UE via the sidelink data channel.

A non-transitory computer-readable medium storing code for wireless communications is described. The code may include instructions executable by a processor to receive, at a first UE, downlink control information from a base station scheduling a second UE for a sidelink data transmission via a sidelink data channel, transmit, to the second UE via a sidelink control channel, sidelink control information scheduling the sidelink data transmission to the second UE and a feedback transmission to be transmitted from the second UE, where a first timing gap is configured between receipt of the sidelink data transmission at the second UE and the feedback transmission from the second UE that is based on a timing capability of the second UE, and transmit the sidelink data transmission to the second UE via the sidelink data channel.

Some examples of the method, apparatuses, and non-transitory computer-readable medium described herein may further include operations, features, means, or instructions for receiving the feedback transmission from the second UE, identifying an uplink control channel resource based on the downlink control information, determining whether a second timing gap between receipt of the feedback transmission at the first UE and the uplink control channel resource satisfies a timing capability of the first UE, and transmitting, to the base station, an uplink control channel transmission on the uplink control channel resource based on the second timing gap satisfying the timing capability of the first UE or identifying an error event for the uplink control channel transmission based on the second timing gap failing to satisfy the timing capability of the first UE.

In some examples of the method, apparatuses, and non-transitory computer-readable medium described herein, the timing capability of the first UE may be based on a minimum processing time at the first UE for decoding the feedback transmission and preparing the uplink control channel transmission.

In some examples of the method, apparatuses, and non-transitory computer-readable medium described herein, the timing capability of the second UE may be based on a minimum processing time at the second UE for a downlink shared channel.

In some examples of the method, apparatuses, and non-transitory computer-readable medium described herein, transmitting the sidelink data transmission further may include operations, features, means, or instructions for transmitting the sidelink data transmission to a plurality of UEs, receiving a plurality of feedback transmissions from the plurality of UEs, identifying an uplink control channel resource based on the downlink control information, determining whether a second timing gap between receipt of a latest feedback transmission of the plurality of feedback transmissions at the first UE and the uplink control channel resource satisfies a timing capability of the first UE, and transmitting, to the base station, an uplink control channel transmission on the uplink control channel resource based on the second timing gap satisfying the timing capability of the first UE or identifying an error event for the uplink control channel transmission based on the second timing gap failing to satisfy the timing capability of the first UE.

In some examples of the method, apparatuses, and non-transitory computer-readable medium described herein, the plurality of feedback transmissions from the plurality of UEs may be transmitted on a same feedback channel resource.

In some examples of the method, apparatuses, and non-transitory computer-readable medium described herein, receiving the plurality of feedback transmissions further may include operations, features, means, or instructions for receiving a first plurality of feedback transmissions from a first plurality of the plurality of UEs on a first feedback channel resource, and receiving a second plurality of feedback transmissions from a second plurality of the plurality of UEs on a second feedback channel resource, where the second feedback channel resource may be different from the first feedback channel resource.

Some examples of the method, apparatuses, and non-transitory computer-readable medium described herein may further include operations, features, means, or instructions for receiving the plurality of feedback transmissions from the plurality of UEs within a timing window, where a size of the timing window may be based on the respective timing capabilities of the plurality of UEs.

In some examples of the method, apparatuses, and non-transitory computer-readable medium described herein, transmitting the sidelink data transmission further may include operations, features, means, or instructions for transmitting the sidelink data transmission to a plurality of UEs, receiving a plurality of feedback transmissions from the plurality of UEs, identifying an uplink control channel resource based on the downlink control information, determining, for each of the plurality of feedback transmissions, whether a respective second timing gap between receipt of a respective feedback transmission at the first UE and the uplink control channel resource satisfies a timing capability of the first UE, and transmitting, to the base station, an uplink control channel transmission on the uplink control channel resource for a first plurality of the plurality of feedback transmissions based on the second timing gap for the first plurality satisfying the timing capability of the first UE, or identifying an error event for a second plurality of the plurality of feedback transmissions based on the second timing gap for the second plurality failing to satisfy the timing capability of the first UE, or both.

Some examples of the method, apparatuses, and non-transitory computer-readable medium described herein may further include operations, features, means, or instructions for dropping respective acknowledgments for the second plurality of the plurality of feedback transmissions in the uplink control channel transmission.

Some examples of the method, apparatuses, and non-transitory computer-readable medium described herein may further include operations, features, means, or instructions for identifying an additional uplink control channel resource based on identifying the error event for the second plurality of the plurality of feedback transmissions, and transmitting, to the base station, an additional uplink control channel transmission on the additional uplink control channel resource including acknowledgments for the second plurality of the plurality of feedback transmissions.

In some examples of the method, apparatuses, and non-transitory computer-readable medium described herein, transmitting the sidelink data transmission may include operations, features, means, or instructions for transmitting the sidelink data transmission via a plurality of transport blocks.

In some examples of the method, apparatuses, and non-transitory computer-readable medium described herein, each of the plurality of transport blocks may be associated with a corresponding feedback transmission.

In some examples of the method, apparatuses, and non-transitory computer-readable medium described herein, the first timing gap may be based on a latest transport block of the plurality of transport blocks.

A method of wireless communications is described. The method may include identifying a first timing capability for a first UE based on a first timing gap between receipt of a downlink control information transmission at the first UE and the first UE preparing a sidelink data transmission, identifying a second timing capability for a second UE based on a second timing gap between receipt of the sidelink data transmission at the second UE and a feedback transmission to be transmitted from the second UE, transmitting, to the first UE, downlink control information scheduling the second UE for the sidelink data transmission, where the downlink control information schedules feedback associated with the sidelink data transmission based on the first timing capability and the second timing capability, and monitoring for feedback associated with the sidelink data transmission.

An apparatus for wireless communications is described. The apparatus may include a processor, memory coupled with the processor, and instructions stored in the memory. The instructions may be executable by the processor to cause the apparatus to identify a first timing capability for a first UE based on a first timing gap between receipt of a downlink control information transmission at the first UE and the first UE preparing a sidelink data transmission, identify a second timing capability for a second UE based on a second timing gap between receipt of the sidelink data transmission at the second UE and a feedback transmission to be transmitted from the second UE, transmit, to the first UE, downlink control information scheduling the second UE for the sidelink data transmission, where the downlink control information schedules feedback associated with the sidelink data transmission based on the first timing capability and the second timing capability, and monitor for feedback associated with the sidelink data transmission.

Another apparatus for wireless communications is described. The apparatus may include means for identifying a first timing capability for a first UE based on a first timing gap between receipt of a downlink control information transmission at the first UE and the first UE preparing a sidelink data transmission, identifying a second timing capability for a second UE based on a second timing gap between receipt of the sidelink data transmission at the second UE and a feedback transmission to be transmitted from the second UE, transmitting, to the first UE, downlink control information scheduling the second UE for the sidelink data transmission, where the downlink control information schedules feedback associated with the sidelink data transmission based on the first timing capability and the second timing capability, and monitoring for feedback associated with the sidelink data transmission.

A non-transitory computer-readable medium storing code for wireless communications is described. The code may include instructions executable by a processor to identify a first timing capability for a first UE based on a first timing gap between receipt of a downlink control information transmission at the first UE and the first UE preparing a sidelink data transmission, identify a second timing capability for a second UE based on a second timing gap between receipt of the sidelink data transmission at the second UE and a feedback transmission to be transmitted from the second UE, transmit, to the first UE, downlink control information scheduling the second UE for the sidelink data transmission, where the downlink control information schedules feedback associated with the sidelink data transmission based on the first timing capability and the second timing capability, and monitor for feedback associated with the sidelink data transmission.

Some examples of the method, apparatuses, and non-transitory computer-readable medium described herein may further include operations, features, means, or instructions for identifying a third timing capability for the first UE based on a third timing gap between the first UE decoding a sidelink feedback channel and the first UE preparing an uplink control channel, where the feedback transmission may be further based on the third timing capability, and receiving, from the first UE, the feedback transmission associated with the sidelink data transmission on the uplink control channel.

Some examples of the method, apparatuses, and non-transitory computer-readable medium described herein may further include operations, features, means, or instructions for receiving an indication that a feedback transmission from the first UE did not satisfy the first timing capability, transmitting, to the first UE, an indication of an additional uplink control channel resource, and monitoring for a retransmission of at least a portion of the feedback transmission from the first UE.

Some examples of the method, apparatuses, and non-transitory computer-readable medium described herein may further include operations, features, means, or instructions for receiving, from the second UE, the feedback transmission associated with the sidelink data transmission.

In some examples of the method, apparatuses, and non-transitory computer-readable medium described herein, the feedback transmission includes a plurality of feedback bits corresponding to a plurality of sidelink data transmissions from the first UE to a plurality of UEs.

DETAILED DESCRIPTION

Figure 1:
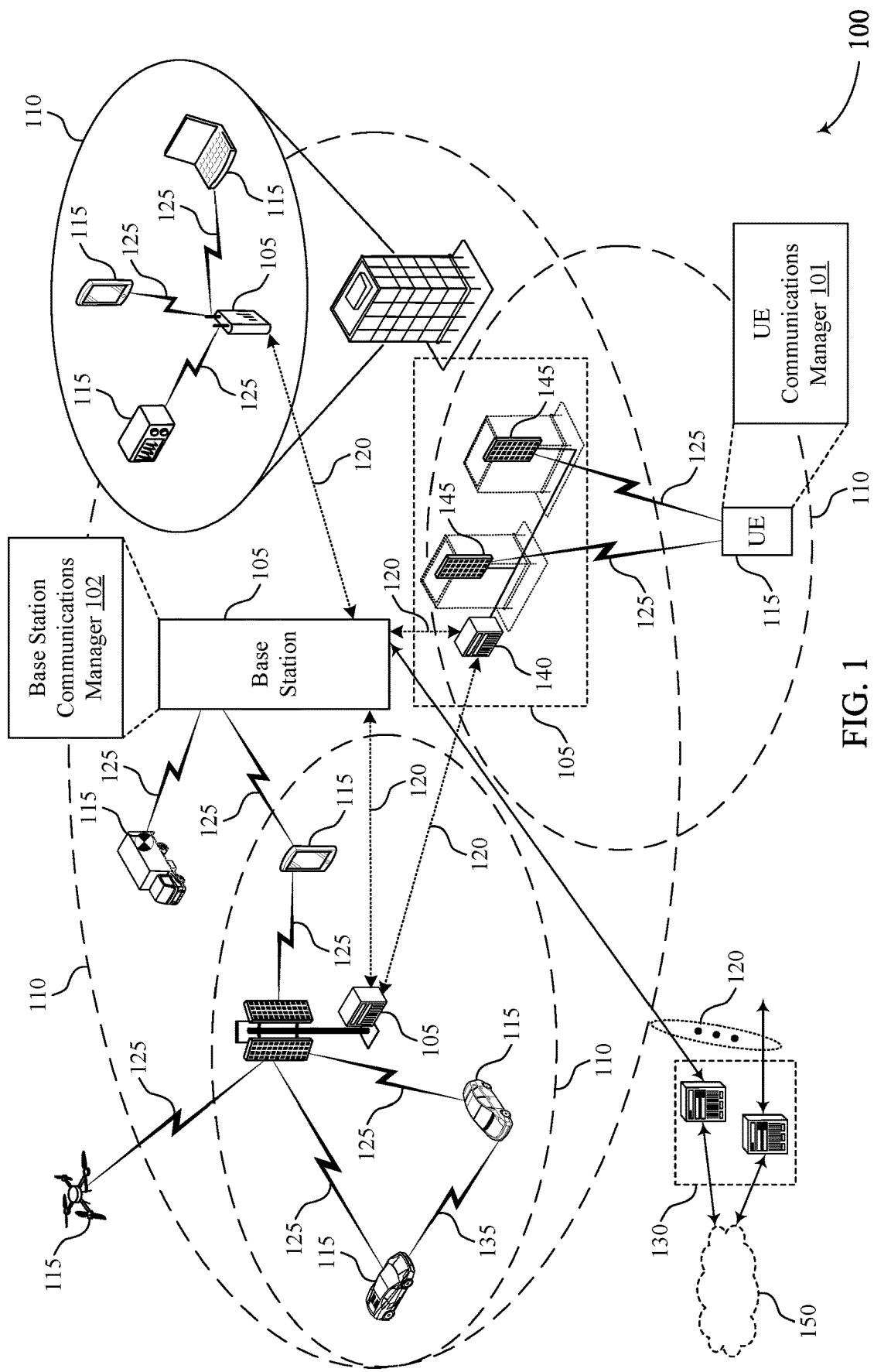
FIG. 1 illustrates an example of a system for wireless communications that supports timing conditions for sidelink feedback reporting in accordance with aspects of the present disclosure.

A wireless communications system may support sidelink communications between two user equipments (UEs). A base station may serve a first, transmitting UE and schedule the first UE to send data to a second, receiving UE on a sidelink channel. The base station may transmit downlink control information (DCI) to schedule the sidelink transmitting UE for the sidelink data transmission. The transmitting sidelink UE may transmit sidelink control information (SCI) on a sidelink control channel to schedule the receiving sidelink UE for a sidelink data transmission on a sidelink shared channel. In some cases, one or more of the sidelink UEs may provide feedback for the sidelink data. For example, the receiving sidelink UE may transmit feedback directly to the base station, or the receiving sidelink UE may send the feedback on a sidelink channel to the transmitting UE, and the transmitting UE may send the feedback to the base station. In some cases, the base station may schedule the resources for the sidelink channels and any uplink control channel used to transmit the feedback. In some other examples, the transmitting UE may select the resources for the sidelink communications.

The sidelink UEs may have different capabilities. For example, the sidelink UEs take different amounts of time to process a first transmission and prepare a second transmission. These capabilities, in some cases referred to as timing capabilities, may correspond to a number of slots or symbols periods. For example, if there are not enough slots between a receipt of the DCI and the sidelink resources for the sidelink data transmission, the transmitting sidelink UE may not be able to decode the DCI and prepare for the sidelink transmission. If the base station does not provide a long enough time gap between the scheduling DCI and feedback resources, one or more of the UEs performing a sidelink communication may not have enough time to decode an incoming transmission and prepare an outgoing transmission. If the base station configures too large of a window between the scheduling DCI and feedback resources, it may lead to delay and higher latency.

The techniques described herein support enhanced sidelink communications scheduling. For example, a base station may consider timing capabilities of the sidelink UEs when scheduling the feedback resource. The base station may schedule using a timing gap between DCI to the transmitting sidelink UE and a feedback resource to the base station, which considers the capabilities of the transmitting sidelink UE and any receiving sidelink UEs. The techniques may be applied for unicast sidelink communications with one or more receiving sidelink UEs and groupcast sidelink communications.

Aspects of the disclosure are initially described in the context of a wireless communications system. Aspects of the disclosure are further illustrated by and described with reference to apparatus diagrams, system diagrams, and flowcharts that relate to timing conditions for sidelink feedback reporting.

FIG. 1 illustrates an example of a wireless communications system 100 that supports path-loss estimation using path-loss reference signal activation and deactivation in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE- Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A medium access control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Some wireless communications systems 100 may support sidelink communications between two UEs 115. A base station 105 may serve a first, transmitting UE 115 and schedule the first UE 115 to send data to a second, receiving UE 115 on a sidelink channel. The base station may transmit DCI to schedule the sidelink transmitting UE 115 for the sidelink data transmission. The transmitting sidelink UE 115 may transmit SCI on a sidelink control channel to schedule the receiving sidelink UE 115 for a sidelink data transmission on a sidelink shared channel. In some cases, one or more of the sidelink UEs 115 may provide feedback for the sidelink data. For example, the receiving sidelink UE115 may transmit feedback directly to the base station, or the receiving sidelink UE 115 may send the feedback on a sidelink channel to the transmitting UE 115, and the transmitting UE 115 may send the feedback to the base station.

The sidelink UEs 115 may have different capabilities. For example, the sidelink UEs 115 take different amounts of time to process a first transmission and prepare a second transmission. These capabilities, in some cases referred to as timing capabilities, may correspond to a number of slots or symbols periods. For example, if there are not enough slots between a receipt of the DCI and the sidelink resources for the sidelink data transmission, the transmitting sidelink UE may not be able to decode the DCI and prepare for the sidelink transmission. The techniques described herein support enhanced sidelink communications scheduling. For example, a base station 105 may consider timing capabilities of the sidelink UEs 115 when scheduling the feedback resource. The base station 105 may schedule using timing gap, between DCI to the transmitting sidelink UE 115 and a feedback resource to the base station 105, which considers the capabilities of the transmitting sidelink UE 115 and any receiving sidelink UEs 115. The techniques may be applied for unicast sidelink communications with one or more receiving sidelink UEs 115 and groupcast sidelink communications.

Specifically, a receiving UE 115 may receive, from a transmitting UE 115, SCI scheduling a sidelink data transmission and feedback associated with the sidelink data transmission, identify a timing gap based on a timing capability of the receiving UE 115, the timing gap configured between a receipt of the scheduled sidelink data transmission to the receiving UE 115 and the feedback from the receiving UE 115, determine whether the timing gap configured between the receipt of the sidelink data transmission at the receiving UE 115 and the feedback from the receiving UE 115 satisfies the timing capability of the receiving UE 115, and transmit the feedback based on the timing gap satisfying the timing capability or detecting an error event for the feedback based on the timing gap failing to satisfy the timing capability. One or more of these operations may be performed by a UE communications manager 101, which may be an example of a communications manager 615, 715, 805, or 910 as described with reference to FIGS. 6 through 9. In some cases, a transceiver may perform the receiving and transmitting operations and a transmit power controller may determine the path-loss estimate and modify the uplink transmit power based on the path-loss estimate.

A transmitting UE 115 may receive DCI from a base station scheduling a second UE for a sidelink data transmission via a sidelink data channel. The transmitting UE 115 may transmit, to the receiving UE 115 via a sidelink control channel, SCI scheduling the sidelink data transmission to the receiving UE 115 and a feedback transmission from the receiving UE 115, where a first timing gap is configured between receipt of the sidelink data transmission at the receiving UE 115 and the feedback transmission from the receiving UE 115. The first timing gap may be based on a timing capability of the receiving UE 115. The transmitting UE 115 may transmit the sidelink data transmission to the receiving UE 115 via the sidelink data channel. One or more of these operations may be performed by a UE communications manager 101, which may be an example of a communications manager 615, 715, 805, or 910 as described with reference to FIGS. 6 through 9. In some cases, a transceiver may perform the receiving and transmitting operations and a transmit power controller may determine the path-loss estimate and modify the uplink transmit power based on the path-loss estimate.

Correspondingly, a base station 105 may identifying a first timing capability for a transmitting UE 115 based on a first timing gap between receipt of a DCI at the transmitting UE 115 and the transmitting UE 115 preparing a sidelink data transmission. The base station 105 may identify a second timing capability for a receiving UE 115 based on a second timing gap between receipt of the sidelink data transmission at the receiving UE 115 and a feedback transmission from the receiving UE 115. The base station 105 may transmit, to the transmitting UE 115, DCI scheduling the receiving UE 115 for the sidelink data transmission, where the DCI schedules feedback associated with the sidelink data transmission based on the first timing capability and the second timing capability, and monitor for feedback associated with the sidelink data transmission. One or more of these operations may be performed by a base station communications manager 102, which may be an example of a communications manager 1015, 1115, 1205, or 1310 as described with reference to FIGS. 10 through 13. In some cases, a transceiver may perform the receiving and transmitting operations, a scheduler may determine the configuration, and an antenna controller may determine the reference signals to activate (e.g., based on one or more communication beams).

Figure 2:
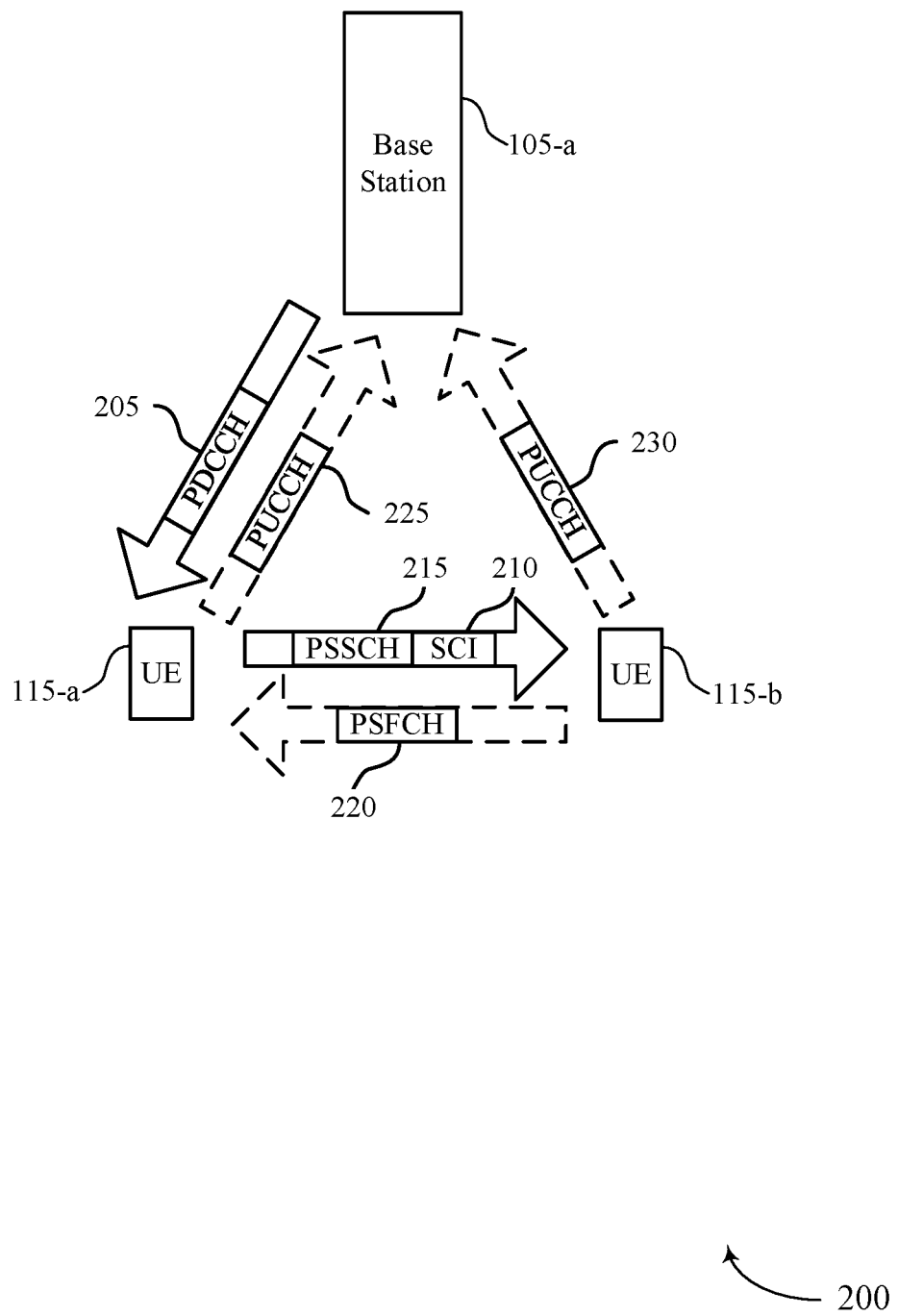
FIG. 2 illustrates an example of a wireless communications system that supports timing conditions for sidelink feedback reporting in accordance with aspects of the present disclosure.

FIG. 2 illustrates an example of a wireless communication system 200 that supports timing conditions for sidelink feedback reporting in accordance with aspects of the present disclosure. In some examples, wireless communications system 200 may implement aspects of wireless communication system 100.

The wireless communications system 200 may support sidelink communications between two UEs 115. For example, base station 105-a may serve UE 115-a. Base station 105-a may schedule UE 115-a to send data to UE 115-b. In some cases, UE 115-a may be referred to as the transmitting UE 115 (e.g., of the sidelink communication), and UE 115-b may be referred to as the receiving UE 115. Base station 105-a may transmit DCI on a downlink control channel 205 (e.g., a physical downlink control channel (PDCCH)) to schedule UE 115-a for the sidelink data transmission. UE 115-a may transmit SCI 210 on a sidelink control channel to schedule UE 115-b for a sidelink data transmission on a sidelink shared channel 215 (e.g., a physical sidelink shared channel (PSSCH)).

In some examples, UE 115-b may provide feedback for the sidelink data. Sidelink hybrid automatic repeat request (HARQ) feedback (e.g., acknowledgement (ACK)/negative acknowledgement (NACK) feedback) may be supported for unicast sidelink communications and groupcast sidelink communications. HARQ reporting for sidelink communications may be enabled or disabled by configuration. In some cases, UE 115-b may transmit the feedback to UE 115-a on a sidelink feedback channel 220 (e.g., a physical sidelink feedback channel (PSFCH)), and UE 115-a may transmit HARQ feedback for the sidelink data on an uplink control channel 225 (e.g., a physical uplink control channel (PUCCH)) to base station 105-a. In another example, UE 115-b may directly transmit the feedback for the sidelink data transmission to base station 105-a, for example on an uplink channel 230, which may be an example or include aspects of a PUCCH, a PSFCH, or both.

The wireless communications system 200 may support multiple kinds of resource allocation selection schemes for sidelink communications. In a first example, base station 105-a may schedule the sidelink resources used by the UEs 115 for the sidelink transmissions. For example, base station 105-a may indicate the resources used for the SCI 210, sidelink shared channel 215, and any channels used to provide feedback. In some cases, a dynamic grant may provide resources for one or more sidelink transmissions of a single transport block. In some cases, a configured grant (e.g., type 1 or type 2) may provide a plurality of resources in a periodic manner for multiple sidelink transmissions. UE 115-a may then decide which transport block to transmit in each of the occasions indicated by the configured grant.

In a second example, the transmitting UE 115 may determine the resources for the sidelink transmission. For example, base station 105-a may configure UE 115-a for the sidelink data transmission via DCI, but UE 115-a may select which resources to use to transmit the SCI 210 and to use for the sidelink shared channel 215. In some examples, UE 115-a may autonomously select the sidelink resources for transmission. In some examples, UE 115-a may assist in sidelink resource selection for other UEs 115, such as UE 115-b. In some examples, UE 115-a may be configured with a configured grant for sidelink transmission, for example, such that UE 115-a may have periodic sidelink transmission resources. In some cases, UE 115-a may schedule the sidelink resources for other UEs. For example, UE 115-a may select which resources UE 115-b uses to transmit feedback for the sidelink data channel.

For some unicast transmission configurations of the first example, UE 115-a may send an indication to base station 105-a to request (e.g., indicate a need for) retransmission. In some cases, UE 115-a may be within the coverage area of base station 105-a, and UE 115-b may not be within the coverage area of base station 105-a. UE 115-a may identify a transmission failure to UE 115-b based on UE 115-a not receiving feedback from UE 115-b. Based on this identification, UE 115-a may request a retransmission from base station 105-a.

For some sidelink communications using a dynamic grant for resource allocation, the timing and resources of an uplink control channel for conveying sidelink HARQ feedback may be based on the indication transmitted on the corresponding downlink control channel 205. For example, base station 105-a may transmit DCI on the downlink control channel 205 to indicate the sidelink data transmission, and the DCI may also include timing and resource information for the uplink control channel 225 or 230. The DCI may indicate a slot offset between DCI reception and a resource for PUCCH used to convey the sidelink HARQ feedback to base station 105-a.

UE 115-a and UE 115-b may have different capabilities and take different amounts of time to process a first transmission and prepare a second transmission. These capabilities, in some cases referred to as timing capabilities, may correspond to a number of slots or symbols periods. For example, if there are not enough slots between receipt of the DCI and resources for UE 115-a to transmit the sidelink transmission, UE 115-a may not be able to decode the DCI and prepare for the sidelink transmission.

In some cases, if UE 115-a is capable of more advanced sidelink communications, but UE 115-b is not capable of more advanced sidelink communications, the UEs 115 may communicate on the sidelink based on the capabilities of UE 115-b. For example, if UE 115-a has more UE capabilities than UE 115-b, then base station 105-a may schedule UE 115-a and UE 115-b based on the capabilities of UE 115-b. In some cases, a timing configuration for two UEs 115 may be based on the capabilities of a weaker, or more limited, UE 115.

In some systems, a base station 105 may consider a timing gap between DCI and an uplink shared channel or a downlink shared channel (e.g., for communications between the base station 105 and a UE 115). However, conventional base stations 105 do not consider timing capabilities of UEs 115 for sidelink communications. The timing capabilities for UEs 115 engaging in sidelink communications may be different from timing capabilities for UEs 115 communicating with a base station. For example, the types of channels used in sidelink communications (e.g., PSFCH, PSSCH) may be different, the information included in sidelink transmissions may be different, transmission directions may be different etc. If a base station 105 does not provide a long enough time gap between scheduling DCI and feedback resources, one or more of the UEs 115 performing a sidelink communication may not have enough time to decode an incoming transmission and prepare an outgoing transmission (e.g., feedback). If the base station 105 configures too large of a window between the scheduling DCI and feedback resources, it may lead to delay and higher latency.

Base stations 105 and UEs 115 described herein may implement techniques for enhanced sidelink scheduling. For example, base station 105-a may consider timing capabilities of UE 115-*a* and UE 115-*b* when scheduling the UEs 115 for a sidelink communication. A timing gap between DCI (e.g., scheduling UE 115-*a* for the sidelink data transmission) and a corresponding feedback resource (e.g., from UE 115-*a* or from UE 115-*b*) may consider the capabilities of UE 115-*a* and UE 115-*b*. If UE 115-*b* provides the feedback, then base station 105-*a* may consider timing gaps N and N'. Timing gap N may refer to a minimum time between UE 115-*a* receiving DCI on a downlink control channel 205 from base station 105-*a* and preparing the SCI 210 or transmission on the sidelink shared channel 215, based on the capability of UE 115-*a*. The timing gap N' may refer to a minimum time between UE 115-*b* receiving the sidelink data and beginning a feedback transmission for the sidelink data, based on the capability of UE 115-*b*. If UE 115-*a* reports the feedback, then base station 105-*a* may consider timing gaps N, N', and N". Timing gap N" may refer to a minimum time between UE 115-*a* receiving the feedback on the sidelink feedback channel 220 and transmitting the HARQ feedback to base station 105-*a* on the uplink control channel 225.

UE 115-*a* and UE 115-*b* may check whether the scheduled resources can satisfy their respective timing capabilities. If a timing gap between scheduled resources for a transmission at one of the UEs 115 can satisfy an associated timing capability, then the UE 115 may proceed with the transmission. If the timing gap does not satisfy the associated timing capability, then the UE 115 may detect and, in some cases, indicate to the other UE 115 or base station 105-*a*, an error case.

UE 115-*a* and UE 115-*b* may report their respective timing capabilities to base station 105-*a*. For example, UE 115-*a* and UE 115-*b* may report their capabilities while establishing a connection with base station 105-*a* (e.g., an RRC connection) or while configuring the sidelink communications. In some cases, base station 105-*a* may request a capability report from the UEs 115, and UE 115-*a* and UE 115-*b* may indicate their timing capabilities based on receiving the request. In some examples, UE 115-*b* may indicate its timing capability via UE 115-*a*, and UE 115-*a* may indicate the timing capabilities for both UEs 115.

Scheduling sidelink communications based on UE capability may be applicable for sidelink communications to multiple receiving UEs, including unicast transmissions to multiple users and groupcast transmissions. In a first example, for groupcast sidelink communications, the transmitting UE 115 may transmit to one group of receiving UEs 115. In some cases of the first example, each of the receiving UEs 115 may transmit ACK/NACK feedback on a same PSFCH resource. In a second example, for groupcast sidelink communications, different subsets of users in the group may transmit ACK/NACK feedback on different PSFCH resources. In a third example, for groupcast sidelink communications, the transmitting UE 115 may transmit to multiple groups of receiving UEs 115. In some cases of the third example, different groups, or sub-groups, may send HARQ-ACK/NACK feedback on different PSFCH resources. In a fourth example, for unicast sidelink transmissions, the transmitting UE 115 may have established a unicast link with multiple receiving UEs 115, and each of the receiving UEs 115 may send HARQ-ACK/NACK on different PSFCH resources.

In the second, third, and fourth examples the transmitting UE 115 may receive transmissions on different sidelink feedback channels at different times. Therefore, the wireless communications system 200 may support techniques for configuring a timing window for the PSFCHs, in which the transmitting UE 115 may receive the different PSFCH transmissions from the different receiving UEs 115, subgroups, or groups. An example of the window is described in more detail with reference to FIG. 5.

In some cases, UE 115-*a* may transmit a transport block multiple times. For example, blind repetition of a single transport block on different PSSCHs may be supported. In some cases, each PSSCH may be acknowledged (e.g., with an ACK or a NACK) separately. In some examples, there may be a single HARQ-ACK/NACK at the end of the repetition bundle. In some cases, the feedback timeline may be based on an ending of the last PSSCH. For example, UE 115-*b* may transmit a single HARQ-ACK/NACK feedback message for the multiple transport blocks.

Figure 3:
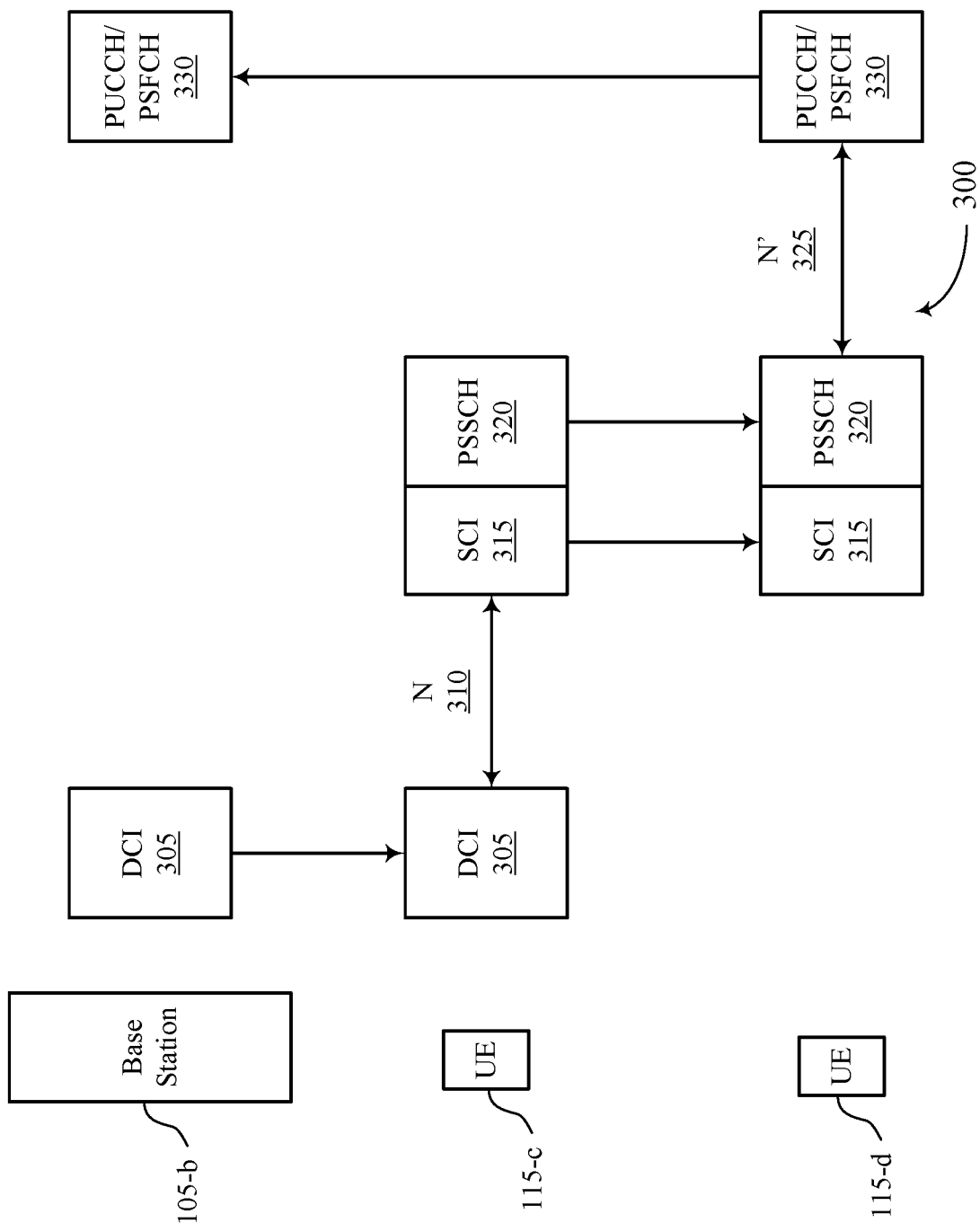
FIGS. 3 through 5 illustrate examples of process flows that support timing conditions for sidelink feedback reporting in accordance with aspects of the present disclosure.

FIG. 3 illustrates an example of a process flow 300 that supports timing conditions for sidelink feedback reporting in accordance with aspects of the present disclosure. In some examples, process flow 300 may implement aspects of wireless communication system 100.

The process flow 300 may include base station 105-*b*, UE 115-*c*, and UE 115-*d*. Base station 105-*b* may be an example of a base station 105 as described with reference to FIGS. 1 and 2, and UE 115-*c* and UE 115-*d* may be examples of UEs 115 described with reference to FIGS. 1 and 2.

The process flow 300 may include aspects of sidelink scheduling that considers UE capabilities. For example, the process flow 300 may be an example of scheduling a sidelink transmission where the feedback is provided to a base station 105 directly from a receiving UE 115. UE 115-*c* may be an example of a transmitting UE 115 for sidelink communications, and UE 115-*d* may be an example of a receiving UE 115 for sidelink communications.

Base station 105-*b* may configure UE 115-*c* to transmit a sidelink data message to UE 115-*d*. Base station 105-*b* may identify a first timing capability for UE 115-*c* based on a first timing gap between a receipt of DCI at UE 115-*c* and UE 115-*c* preparing a sidelink data transmission. In some cases, N, as described with reference to FIG. 2, may be an example of the first timing capability for UE 115-*c*. Base station 105-*b* may identify a second timing capability for UE 115-*d* based on a second timing gap between a receipt of the sidelink data transmission at UE 115-*d* and a feedback transmission from UE 115-*d*. In some examples, N', as described with reference to FIG. 2, may be an example of the second timing capability for UE 115-*d*. Therefore, base station 105-*b* may consider the timing capabilities of UE 115-*c* and UE 115-*d* when configuring these UEs 115 for a sidelink communication.

Base station 105-*b* may transmit, to UE 115-*c*, a DCI 305 scheduling UE 115-*d* for the sidelink data transmission. The DCI 305 may schedule feedback associated with the sidelink data transmission based on the first timing capability (e.g., N) and the second timing capability (e.g., N'). The example of process flow 300 may include unicast sidelink transmission to a single sidelink receiving UE 115 (e.g., UE 115-*d*) and HARQ-ACK reporting by the sidelink receiving UE 115, so the timeline between the DCI 305 and an uplink channel 330 may be based on timing capabilities N and N' (e.g., of UE 115-*c* and UE 115-*d*, respectively). For example, a total time gap between a DCI 305 scheduling the sidelink data transmission and the uplink channel 330 for UE 115-*d* to report feedback for the sidelink data transmission may span at least N 310 and N' 325.

UE 115-*c* may receive the DCI 305 from base station 105-*b* scheduling UE 115-*c* for the sidelink data transmission via a sidelink data channel (e.g., a PSSCH 320). UE 115-*c* may transmit SCI 315 to schedule the sidelink data transmission (e.g., on PSSCH 320) and a feedback transmission from UE 115-d. A first timing gap may be configured between receipt of the sidelink data transmission at UE 115-d and the feedback transmission from UE 115-d that is based on a timing capability of UE 115-d (e.g., N' 325). UE 115-c may then transmit the sidelink data transmission to UE 115-d via the PSSCH 320.

Therefore, UE 115-c may schedule resources for the sidelink data transmission and corresponding resources for sidelink data feedback based on a timing capability of UE 115-d, such as N'. In some examples, if base station 105-b determines all of the resource allocations of the sidelink data transmission, then base station 105-b may configure UE 115-d to indicate the resource allocations for the sidelink data transmission and corresponding feedback based on N'.

In some cases, UE 115-c may check whether a timing gap between the DCI 305 and the sidelink data transmission satisfies a timing capability (e.g., N) of UE 115-c. If the timing gap satisfies N, then UE 115-c may transmit the sidelink data transmission to UE 115-d. Otherwise, UE 115-c may indicate an error.

The timing capability N of UE 115-c may be based on a minimum processing time for preparing an uplink shared channel message at UE 115-c. In some cases, the timing capability N may be based on another timing capability, N2. N2 may correspond to the minimum processing time needed to prepare an uplink shared channel message. For example, N may be equal to N2+$d_1$, where $d_1$ may be a positive value, a negative value, or zero (e.g., N=N2). In some cases, the difference between N2 and N may be based on a difference between preparing an uplink shared channel message and preparing a sidelink shared channel message. In some examples, $d_1$ may be based on UE capability (e.g., of UE 115-c or another UE 115).

UE 115-d may receive the SCI 315 scheduling the sidelink data transmission and feedback associated with the sidelink data transmission. UE 115-d may receive the PSSCH 320 carrying the sidelink data. UE 115-d may identify a timing gap based on a timing capability of UE 115-d (e.g., N' 325), the timing gap configured between a receipt of the scheduled sidelink data transmission to UE 115-d and feedback from UE 115-d. UE 115-d may determine whether the timing gap configured between the receipt of the sidelink data transmission and the feedback from UE 115-d satisfies the timing capability of UE 115-d.

The timing capability N' of UE 115-d may be based on a minimum processing time for downlink shared channel processing at UE 115-d. In some cases, the timing capability N' may be based on another timing capability, N1. N1 may correspond to the minimum processing time needed for physical downlink shared channel (PDSCH) processing. For example, N' may be equal to N1+$d_2$, where $d_2$ may be a positive value, a negative value, or zero (e.g., N'=N1). If, for example, $d_2$ is negative, then UE 115-d may process the PSSCH 320 faster than UE 115-d processes a PDSCH. In some cases, the timing capability N' may also be based on an amount of time UE 115-d takes to prepare the feedback message. For example, N' may be based on a processing time for UE 115-d to prepare a message on the uplink channel 330. For example, N' maybe based on an amount of time for UE 115-d to generate a PUCCH transmission or a PSFCH transmission. In some examples, $d_2$ may be based on UE capability (e.g., of UE 115-d or another UE 115).

In some examples, UE 115-d may transmit the feedback based on the timing gap satisfying the timing capability. For example, if the timing gap is at least as large as N' 325, then UE 115-d may transmit the feedback on the uplink channel 330. In some cases, the uplink channel 330 may be an example of a PUCCH or a PSFCH. In the example of process flow 300, UE 115-d may transmit the feedback to base station 105-b.

In some cases, UE 115-d may detect an error event for the feedback based on the timing gap failing to satisfy the timing capability. For example, if the timing gap is smaller than N' 325, then UE 115-d may not be ready to transmit the feedback in time. In some cases, UE 115-d may report the error event to UE 115-c, to base station 105-b, or to both.

Figure 4:
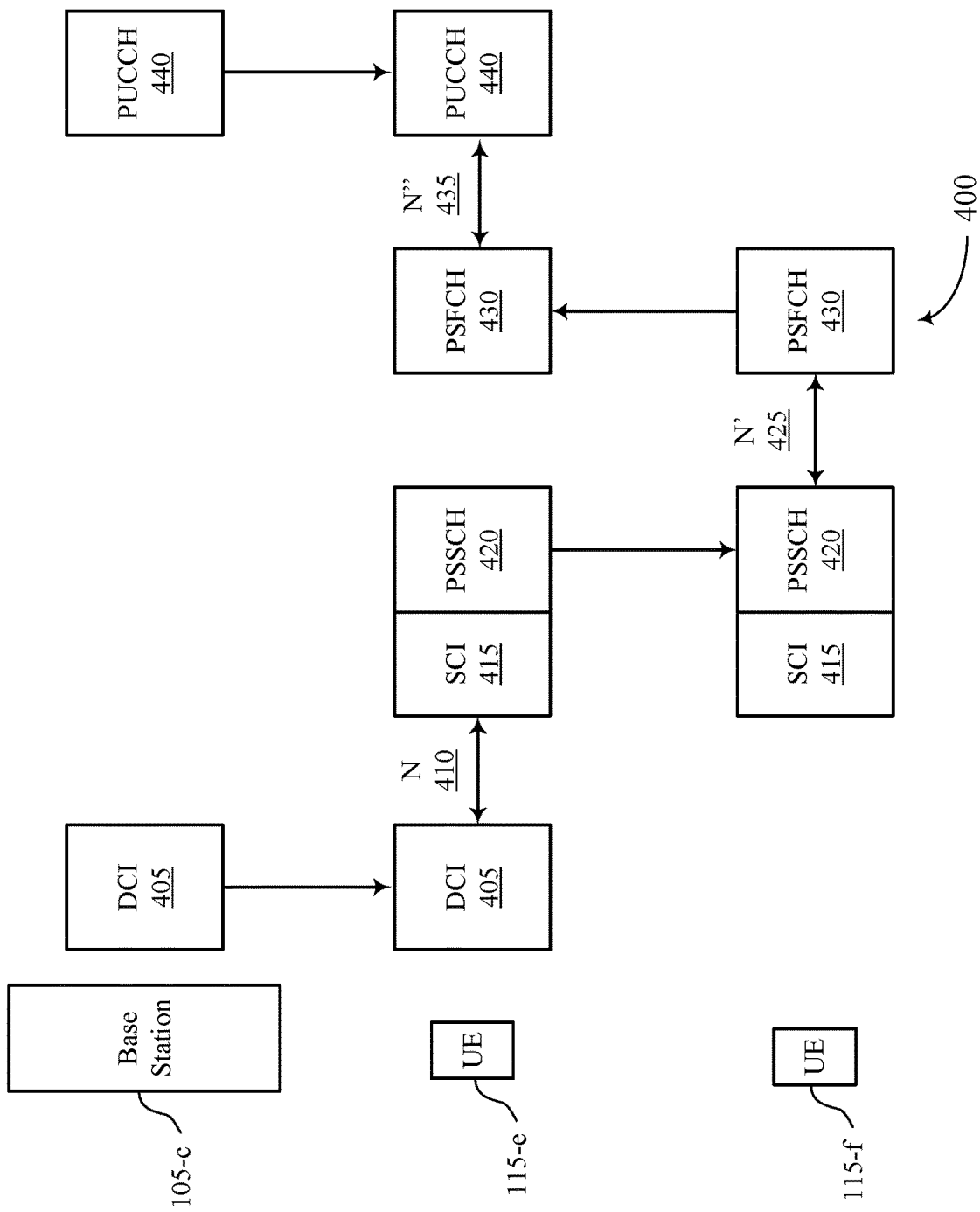

FIG. 4 illustrates an example of a process flow 400 that supports timing conditions for sidelink feedback reporting in accordance with aspects of the present disclosure. In some examples, process flow 400 may implement aspects of wireless communication system 100.

The process flow 400 may include base station 105-c, UE 115-e, and UE 115-f. Base station 105-c may be an example of a base station 105 as described with reference to FIGS. 1 and 2, and UE 115-e and UE 115-f may be examples of UEs 115 described with reference to FIGS. 1 and 2.

The process flow 400 may include aspects of sidelink scheduling that considers UE capabilities. For example, the process flow 400 may be an example of scheduling a sidelink transmission where the feedback is provided from a receiving UE 115 to a transmitting UE 115, then the transmitting UE 115 may send HARQ feedback for the sidelink transmission to a base station 105. UE 115-e may be an example of a transmitting UE 115 for sidelink communications, and UE 115-f may be an example of a receiving UE 115 for sidelink communications.

Base station 105-c may configure UE 115-e to transmit a sidelink data message to UE 115-f. Base station 105-c may identify a first timing capability for UE 115-e based on a first timing gap between a receipt of DCI at UE 115-e and UE 115-e preparing a sidelink data transmission. In some cases, N, as described with reference to FIG. 2, may be an example of the first timing capability for UE 115-e. Base station 105-c may identify a second timing capability for UE 115-e based on a second timing gap between a receipt of the sidelink data transmission at UE 115-f and a feedback transmission from UE 115-f. In some examples, N', as described with reference to FIG. 2, may be an example of the second timing capability for UE 115-f.

In the example of process flow 400, UE 115-f may be configured to report feedback for the sidelink data transmission to UE 115-e, and UE 115-e may transmit the feedback to base station 105-c. Therefore, base station 105-c may identify a third timing capability for UE 115-e based on a third timing gap between UE 115-e decoding a sidelink feedback channel and UE 115-e preparing an uplink control channel. In some cases, N", as described with reference to FIG. 2, may be an example of the third timing capability for UE 115-e. The DCI scheduling the feedback transmission may further be based on the third timing capability. For example, a total time gap between a DCI 405 scheduling the sidelink data transmission and a PUCCH 440 for UE 115-e to report feedback for the sidelink data transmission may span at least N 410, N' 425, and N" 435. Therefore, base station 105-c may consider the timing capabilities of UE 115-e and UE 115-f when configuring these UEs 115 for a sidelink communication.

Base station 105-c may transmit, to UE 115-e, a DCI 405 scheduling UE 115-e for the sidelink data transmission. The DCI 405 may schedule feedback associated with the sidelink data transmission based on the first timing capability (e.g., N 410), the second timing capability (e.g., N' 425), and the third timing capability (e.g., N" 435). The example of process flow 400 may include unicast sidelink transmission to a single sidelink receiving UE 115 (e.g., UE 115-*f*), and HARQ-ACK feedback may be reported by the sidelink transmitting UE 115 (e.g., UE 115-*e*), so the timeline between the DCI 405 and the PUCCH 440 may be based on timing capabilities N, N', and N".

UE 115-*e* may receive the DCI 405 from base station 105-*c* scheduling UE 115-*e* for the sidelink data transmission via a sidelink data channel (e.g., a PSSCH 420). UE 115-*e* may transmit SCI 415 to schedule the sidelink data transmission (e.g., on PSSCH 420) and a feedback transmission from UE 115-*f*. A first timing gap may be configured between receipt of the sidelink data transmission at UE 115-*f* and the feedback transmission from UE 115-*f* that is based on a timing capability of UE 115-*f* (e.g., N' 425). UE 115-*e* may then transmit the sidelink data transmission to UE 115-*f* via the PSSCH 420.

Therefore, UE 115-*e* may schedule resources for the sidelink data transmission and corresponding resources for sidelink data feedback based on a timing capability of UE 115-*f*, such as N'. In some examples, if base station 105-*c* determines all of the resource allocations of the sidelink data transmission, then base station 105-*c* may configure UE 115-*e* to indicate (e.g., to a receiving UE 115, such as UE 115-*f*) the resource allocations for the sidelink data transmission and corresponding feedback based on N'.

In some cases, UE 115-*e* may check whether a timing gap between the DCI 405 and the sidelink data transmission satisfies a timing capability (e.g., N 410) of UE 115-*e*. If the timing gap satisfies N 410, then UE 115-*e* may transmit the sidelink data transmission to UE 115-*f* Otherwise, UE 115-*e* may indicate an error. N 410 may be similar to N 310 described with reference to FIG. 3.

UE 115-*f* may receive the SCI 415 scheduling the sidelink data transmission and feedback associated with the sidelink data transmission. UE 115-*f* may receive the PSSCH 420 carrying the sidelink data. UE 115-*f* may identify a timing gap based on a timing capability of UE 115-*f* (e.g., N' 425), the timing gap configured between a receipt of the scheduled sidelink data transmission to UE 115-*f* and feedback from UE 115-*f*. UE 115-*f* may determine whether the timing gap configured between the receipt of the sidelink data transmission and the feedback from UE 115-*f* satisfies the timing capability of UE 115-*f*. The timing capability N' 425 may be similar to N' 325 described with reference to FIG. 3. In some cases, N' 425 may be slightly different than N' 325, as UE 115-*f* may prepare a transmission on a PSFCH 430 to UE 115-*e* instead of preparing a transmission directly to base station 105-*c*.

In some examples, UE 115-*f* may transmit the feedback to UE 115-*e* based on the timing gap satisfying the timing capability. For example, if the timing gap is at least as large as N' 425, then UE 115-*f* may transmit the feedback on the PSFCH 430. In some cases, UE 115-*f* may detect an error event for the feedback based on the timing gap failing to satisfy the timing capability. For example, if the timing gap is smaller than N' 425, then UE 115-*f* may not be ready to transmit the feedback in time. In some cases, UE 115-*f* may report the error event to UE 115-*e*, to base station 105-*c*, or to both.

UE 115-*e* may receive the feedback transmission from UE 115-*f*. UE 115-*e* may identify an uplink control channel resource (e.g., the PUCCH 440) based on the DCI 405. UE 115-*e* may determine whether a second timing gap between receipt of the feedback transmission and the uplink control channel resource satisfies a timing capability of UE 115-*e*. For example, UE 115-*e* may determine whether the timing gap between the PSFCH 430 and the PUCCH 440 satisfies N" 435. N" 435 may be based on a capability of UE 115-*e* to decode a channel (e.g., the PSFCH 430) and prepare the PUCCH 440. In some examples, N" 435 may be based on another timing capability, such as N1.

In some cases, UE 115-*e* may transmit, to base station 105-*c*, an uplink control channel transmission on the uplink control channel resource based on the second timing gap satisfying the timing capability of UE 115-*e*. Alternatively, UE 115-*e* may detect an error event for the uplink control channel transmission based on the second timing gap failing to satisfy the timing capability of UE 115-*e*. Base station 105-*c* may receive, from UE 115-*e*, the feedback transmission associated with the sidelink data transmission on the PUCCH 440.

Figure 5:
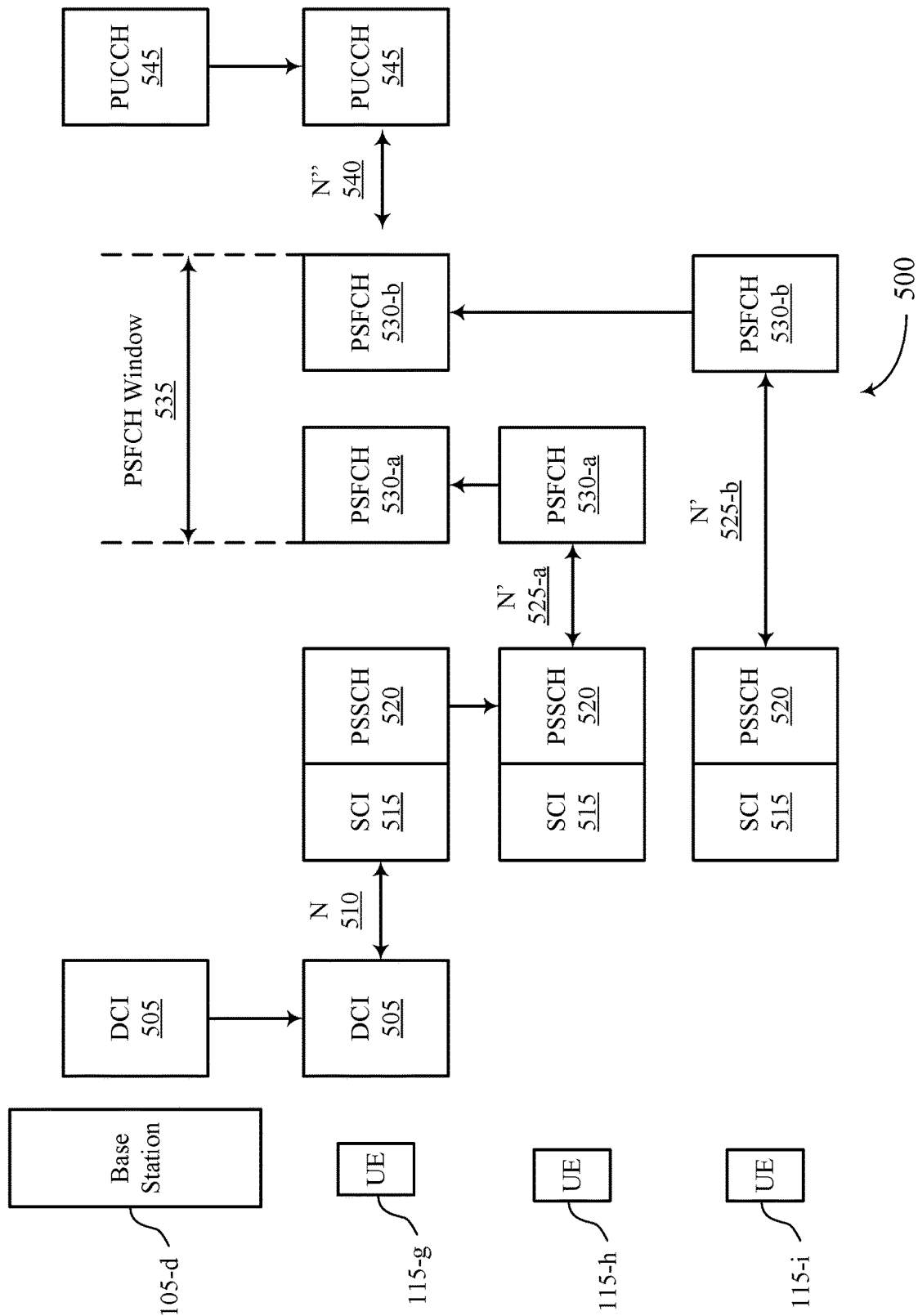

FIG. 5 illustrates an example of a process flow 500 that supports timing conditions for sidelink feedback reporting in accordance with aspects of the present disclosure. In some examples, process flow 500 may implement aspects of wireless communication system 100.

The process flow 500 may include aspects of sidelink scheduling that considers UE capabilities. For example, the process flow 500 may be an example of scheduling sidelink transmissions for multiple receiving UEs 115. The receiving UEs 115 may transmit feedback on different PSFCHs 530, and the transmitting UE 115 may send HARQ feedback for the sidelink transmission to a base station 105. UE 115-*g* may be an example of a transmitting UE 115 for sidelink communications, and UE 115-*h* and UE 115-*i* may be examples of receiving UEs 115 for sidelink communications.

As described with reference to FIG. 2, in some cases, the transmitting UE 115 may receive different PSFCHs 530 at different times. The sidelink communications between the UEs 115 may support a gap between a DCI 505 configuring the sidelink transmissions and a PUCCH 545 so that the HARQ bits for the PSFCHs 530 can be sent on the PUCCH 545 back to base station 105-*d*.

Base station 105-*d* may configure UE 115-*g* to transmit a sidelink data message to UE 115-*h* and UE 115-*i*. The transmission may be groupcast or unicast to multiple receiving UEs 115. Base station 105-*d* may identify a first timing capability for UE 115-*g* based on a timing gap between receipt of DCI at UE 115-*g* and UE 115-*g* preparing a sidelink data transmission. In some cases, N, as described with reference to FIG. 2, may be an example of the first timing capability for UE 115-*g*. Base station 105-*d* may identify respective second timing capabilities for UE 115-*h* and UE 115-*i* based on respective second timing gaps between receipt of the sidelink data transmission at the receiving UEs 115 and respective feedback transmissions from the receiving UEs 115. In some examples, N', as described with reference to FIG. 2, may be an example of the second timing capability for UE 115-*h* and UE 115-*i*. For example, UE 115-*h* may have a second timing capability of N' 525-*a*, and UE 115-*i* may have a second timing capability of N' 525-*b*.

In the example of process flow 500, UE 115-*h* and UE 115-*i* may each be configured to report feedback for the sidelink data transmission to UE 115-*g*, and UE 115-*g* may transmit the feedback to base station 105-*d*. Therefore, base station 105-*d* may identify a third timing capability for UE 115-*g* based on a third timing gap between UE 115-*g* decoding the PSFCHs 530 and UE 115-*g* preparing the PUCCH 545. In some cases, N", as described with reference to FIG. 2, may be an example of the third timing capability for UE 115-*g*. The DCI scheduling the feedback transmission may further be based on the third timing capability.

UE 115-*h* and UE 115-*i* may be assigned different resources for transmitting feedback. For example, UE 115-*h* and UE 115-*i* may be in different groups for a groupcast sidelink transmission or different sub-groups of the same group. Alternatively, the sidelink transmission may be unicast to multiple UEs, and each of the multiple UEs 115 may be assigned different PSFCH resources. In some cases, the receiving UEs 115 may transmit feedback on different PSFCHs 430 based on having different timing capabilities. For example, UE 115-*i* may take longer to process the PSSCH 520 and prepare a PSFCH 530 than UE 115-*h*.

The receiving UEs 115 may each transmit feedback on a PSFCH 530 within a PSFCH window 535. The time for the reception of all of the PSFCHs 530 may be considered when the gap between the DCI 505 and the PUCCH 545 is indicated by base station 105-*d*. In some cases, the gap between the DCI 505 and the PUCCH 545 may be based on a function of N″ 540, where N″ 540 is measured from the last symbol of the last PSFCH 530. For example, PSFCH 530-*b* may be a latest received PSFCH in response to the PSSCH 520. Therefore, N″ 540 may start after UE 115-*g* receives the feedback from UE 115-*i* on PSFCH 530-*b*.

In some examples, the PSFCH window 535 may be defined for each group of UEs 115 that the transmitting UE 115 is in communication with separately. For example, UE 115-*g* may be in communication with multiple different groups for groupcast communications. In some cases, for each group, each PSFCH may be received such that the last symbol of the last received PSFCH (e.g., of each group) may be at least N″ symbols (or slots) away from the beginning of the PUCCH. In some examples, each group may have a separate PSFCH window 535.

For example, a total time gap between a DCI 505 scheduling the sidelink data transmission and a PUCCH 545 for UE 115-*g* to report feedback for the sidelink data transmission may span at least N 510, a largest N′ 525 (e.g., N′ 525-*b*), and N″ 540. Therefore, base station 105-*d* may consider the timing capabilities of UE 115-*h* and UE 115-*i* when configuring these UEs 115 for a sidelink communication.

Base station 105-*d* may transmit a DCI 505 scheduling UE 115-*g* for the sidelink data transmission. The DCI 505 may also schedule a PUCCH 545 for UE 115-*g* to transmit feedback to base station 105-*d*. A gap between the DCI 505 and the PUCCH 545 may span at least N 510, the largest N′ 525, and N″ 540. UE 115-*g* may receive the DCI 505 and transmit SCI 515 to schedule a PSSCH 520 and one or more PSFCHs 530. The SCI 515 and the PSSCH 520 may be groupcast (e.g., to one or more groups of receiving UEs 115) or unicast to multiple UEs (e.g., including UE 115-*h* and UE 115-*i*).

The SCI 515 may indicate respective PSFCHs 530, which may be based on the timing capabilities of the receiving UEs 115. For example, UE 115-*h* may identify PSFCH 530-*a*, and UE 115-*i* may identify PSFCH 530-*b*. UE 115-*h* may then transmit the sidelink data transmission to UE 115-*i* via the PSSCH 420. In some cases, UE 115-*h* and UE 115-*i* may receive the same SCI 515 and PSSCH 520. In some cases, the PSSCH 520 may be encoded with different group identifiers or UE identifiers, and the different receiving UEs 115 may decode the SCI 515, PSSCH 520, or both, using respective identifiers.

UE 115-*h* and UE 115-*i* may each receive the SCI 515 and identify respective PSFCHs 530. If N′ 525 is satisfied for a receiving UE 115, that receiving UE 115 may transmit feedback on the corresponding PSFCH 530. For example, if a timing gap between the PSSCH 520 and PSFCH 530-*a* satisfies N′ 525-*a*, then UE 115-*h* may transmit feedback for the sidelink data on PSFCH 530-*a*. If the timing gap between the PSSCH 520 and the PSFCH 530-*a* is smaller than N′ 525-*a*, then UE 115-*h* may not be ready to transmit the feedback in time.

UE 115-*g* may receive the feedback transmissions from the receiving UEs 115 on corresponding PSFCHs 530. In some cases, some of the PSFCHs 530 may not satisfy a timeline for the corresponding receiving UE 115. This may be considered an error case. In some cases, receiving a PSFCH 530 outside of the PSFCH window 535 may be an error case based on base station 105-*d* having configured and indicated (e.g., via the DCI 505) the gap between the PSSCH 520 and each PSFCH 530. So, if one of the PSFCHs 530 does not satisfy the timeline, an error may have occurred. In some examples, feedback transmitted on PSFCHs 530 which do not satisfy the timeline may be dropped for the feedback transmission on the PUCCH 545. In some examples, the HARQ-ACK of PSFCHs 530 that do not satisfy the timeline may be transmitted to base station 105-*d* by UE 115-*g* at a later PUCCH resource, which may be indicated by base station 105-*d*. UE 115-*g* may then transmit the feedback to base station 105-*d* on PUCCH 545.

Figure 6:
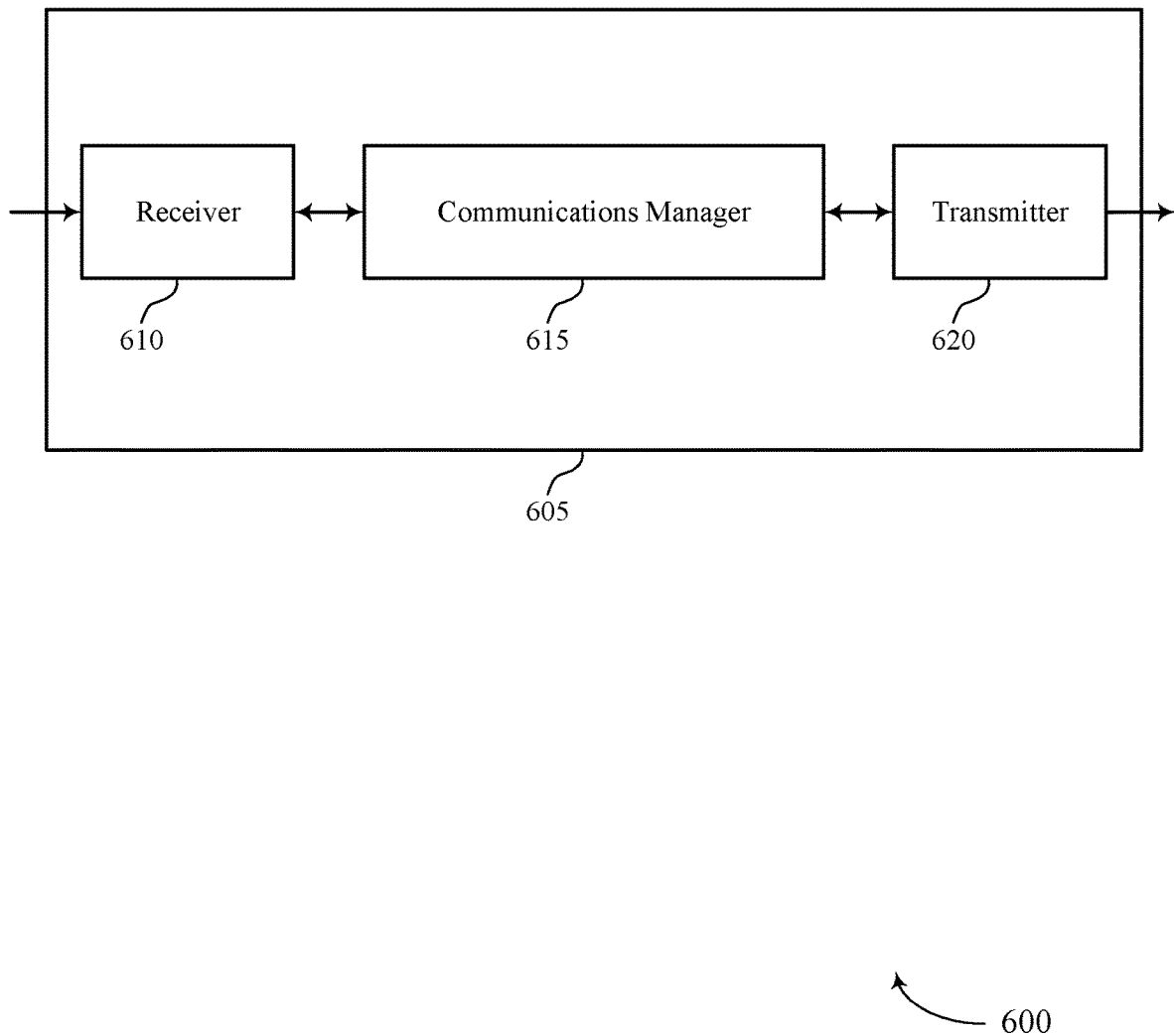
FIGS. 6 and 7 show block diagrams of devices that support timing conditions for sidelink feedback reporting in accordance with aspects of the present disclosure.

FIG. 6 shows a block diagram 600 of a device 605 that supports timing conditions for sidelink feedback reporting in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to timing conditions for sidelink feedback reporting, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a first UE, sidelink control information scheduling a sidelink data transmission and feedback associated with the sidelink data transmission, identify, at a second UE, a timing gap based on a timing capability of the second UE, the timing gap configured between a receipt of the scheduled sidelink data transmission to the second UE and the feedback from the second UE, determine whether the timing gap configured between the receipt of the sidelink data transmission at the second UE and the feedback from the second UE satisfies the timing capability of the second UE, and transmit the feedback based on the timing gap satisfying the timing capability or detecting an error event for the feedback based on the timing gap failing to satisfy the timing capability. The communications manager 615 may also receive, at a first UE, downlink control information from a base station scheduling a second UE for a sidelink data transmission via a sidelink data channel, transmit, to the second UE via a sidelink control channel, sidelink control information scheduling the sidelink data transmission to the second UE and a feedback transmission from the second UE, where a first timing gap is configured between receipt of the sidelink data transmission at the second UE and the feedback transmission from the second UE that is based on a timing capability of the second UE, and transmit the sidelink data transmission to the second UE via the sidelink data channel. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
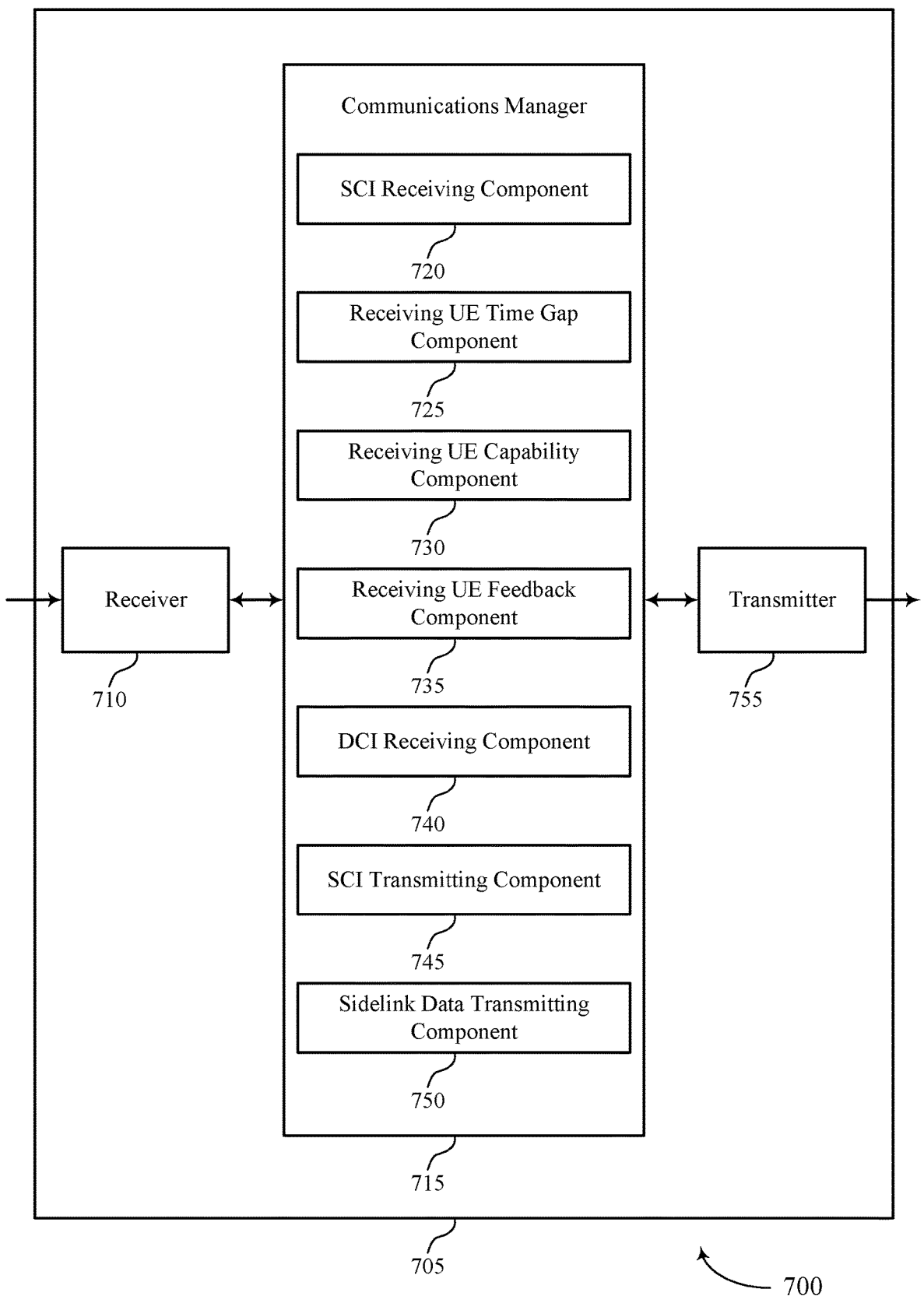

FIG. 7 shows a block diagram 700 of a device 705 that supports timing conditions for sidelink feedback reporting in accordance with aspects of the present disclosure. The device 705 may be an example of aspects of a device 605, or a UE 115 as described herein. The device 705 may include a receiver 710, a communications manager 715, and a transmitter 755. The device 705 may also include a processor. Each of these components may be in communication with one another (e.g., via one or more buses).

The receiver 710 may receive information such as packets, user data, or control information associated with various information channels (e.g., control channels, data channels, and information related to timing conditions for sidelink feedback reporting, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a SCI receiving component 720, a receiving UE time gap component 725, a receiving UE capability component 730, a receiving UE feedback component 735, a DCI receiving component 740, a SCI transmitting component 745, and a sidelink data transmitting component 750. The communications manager 715 may be an example of aspects of the communications manager 910 described herein.

The SCI receiving component 720 may receive, from a first UE, sidelink control information scheduling a sidelink data transmission and feedback associated with the sidelink data transmission. The receiving UE time gap component 725 may identify, at a second UE, a timing gap based on a timing capability of the second UE, the timing gap configured between a receipt of the scheduled sidelink data transmission to the second UE and the feedback from the second UE. The receiving UE capability component 730 may determine whether the timing gap configured between the receipt of the sidelink data transmission at the second UE and the feedback from the second UE satisfies the timing capability of the second UE. The receiving UE feedback component 735 may transmit the feedback based on the timing gap satisfying the timing capability or detecting an error event for the feedback based on the timing gap failing to satisfy the timing capability.

The DCI receiving component 740 may receive, at a first UE, downlink control information from a base station scheduling a second UE for a sidelink data transmission via a sidelink data channel. The SCI transmitting component 745 may transmit, to the second UE via a sidelink control channel, sidelink control information scheduling the sidelink data transmission to the second UE and a feedback transmission from the second UE, where a first timing gap is configured between receipt of the sidelink data transmission at the second UE and the feedback transmission from the second UE that is based on a timing capability of the second UE. The sidelink data transmitting component 750 may transmit the sidelink data transmission to the second UE via the sidelink data channel.

The transmitter 755 may transmit signals generated by other components of the device 705. In some examples, the transmitter 755 may be collocated with a receiver 710 in a transceiver module. For example, the transmitter 755 may be an example of aspects of the transceiver 920 described with reference to FIG. 9. The transmitter 755 may utilize a single antenna or a set of antennas.

Figure 8:
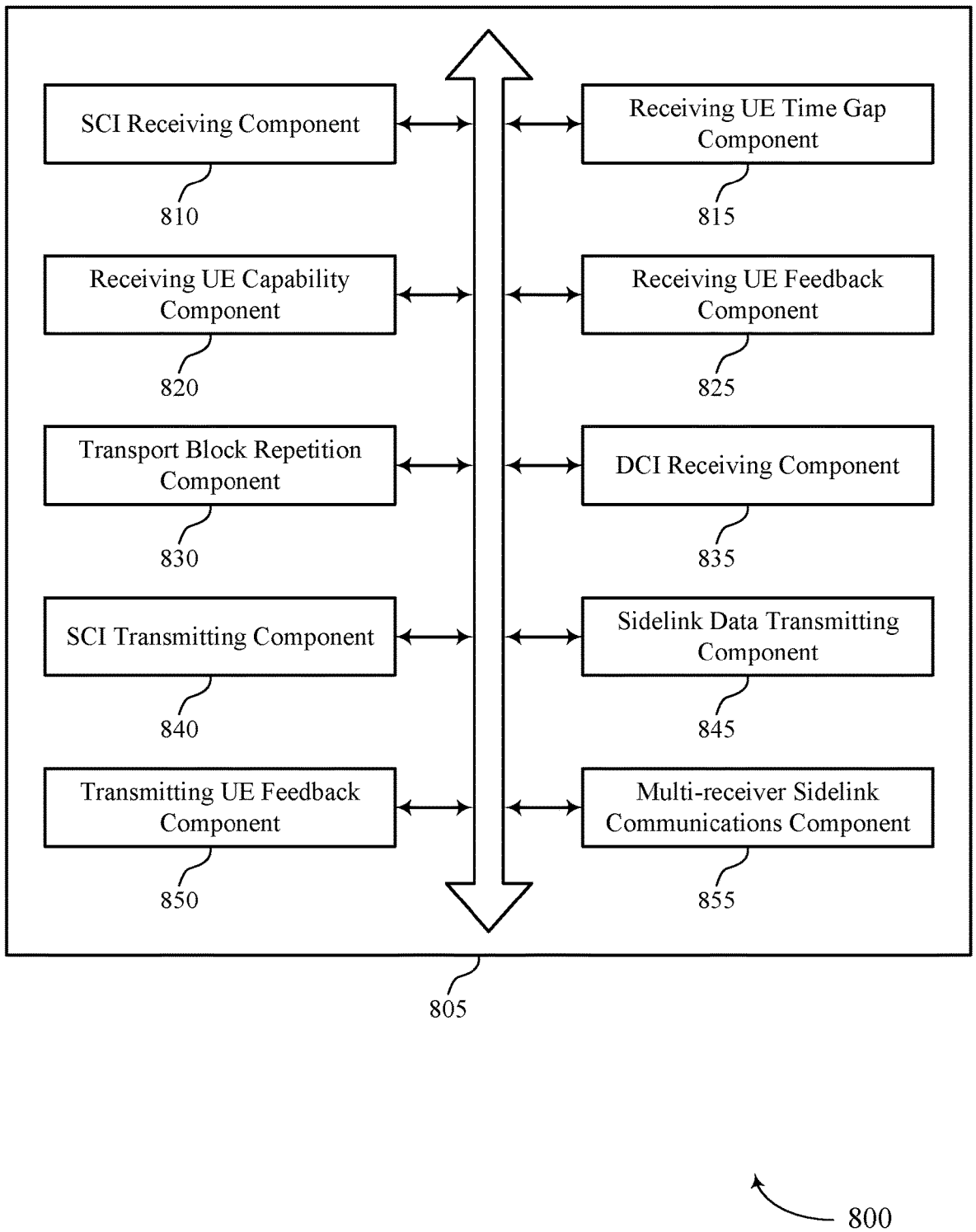
FIG. 8 shows a block diagram of a communications manager that supports timing conditions for sidelink feedback reporting in accordance with aspects of the present disclosure.

FIG. 8 shows a block diagram 800 of a communications manager 805 that supports timing conditions for sidelink feedback reporting in accordance with aspects of the present disclosure. The communications manager 805 may be an example of aspects of a communications manager 615, a communications manager 715, or a communications manager 910 described herein. The communications manager 805 may include a SCI receiving component 810, a receiving UE time gap component 815, a receiving UE capability component 820, a receiving UE feedback component 825, a transport block repetition component 830, a DCI receiving component 835, a SCI transmitting component 840, a sidelink data transmitting component 845, a transmitting UE feedback component 850, and a multi-receiver sidelink communications component 855. Each of these modules may communicate, directly or indirectly, with one another (e.g., via one or more buses).

The SCI receiving component 810 may receive, from a first UE, sidelink control information scheduling a sidelink data transmission and feedback associated with the sidelink data transmission. The receiving UE time gap component 815 may identify, at a second UE, a timing gap based on a timing capability of the second UE, the timing gap configured between a receipt of the scheduled sidelink data transmission to the second UE and the feedback from the second UE.

The receiving UE capability component 820 may determine whether the timing gap configured between the receipt of the sidelink data transmission at the second UE and the feedback from the second UE satisfies the timing capability of the second UE. In some cases, the timing capability of the second UE is based on a minimum processing time at the second UE for a downlink shared channel.

The receiving UE feedback component 825 may transmit the feedback based on the timing gap satisfying the timing capability or detecting an error event for the feedback based on the timing gap failing to satisfy the timing capability. In some examples, the receiving UE feedback component 825 may transmit the feedback to the first UE.

In some examples, the receiving UE feedback component 825 may identify a resource for transmitting the feedback based on the second UE being associated with a group of UEs. In some examples, the receiving UE feedback component 825 may transmit the feedback to a base station on a physical uplink control channel or on a physical sidelink feedback channel.

In some examples, the receiving UE feedback component 825 may receive an indication that an acknowledgment to a base station corresponding to the feedback has been dropped. In some examples, the receiving UE feedback component 825 may receive an indication that an acknowledgment to a base station corresponding to the feedback is to be transmitted by the first UE in a later uplink control channel transmission. The DCI receiving component 835 may receive, at a first UE, downlink control information from a base station scheduling a second UE for a sidelink data transmission via a sidelink data channel.

The SCI transmitting component 840 may transmit, to the second UE via a sidelink control channel, sidelink control information scheduling the sidelink data transmission to the second UE and a feedback transmission from the second UE, where a first timing gap is configured between receipt of the sidelink data transmission at the second UE and the feedback transmission from the second UE that is based on a timing capability of the second UE. In some cases, the timing capability of the second UE is based on a minimum processing time at the second UE for a downlink shared channel. The sidelink data transmitting component 845 may transmit the sidelink data transmission to the second UE via the sidelink data channel.

The transport block repetition component 830 may receive the sidelink data transmission via a plurality of transport blocks. In some examples, the transport block repetition component 830 may transmit corresponding feedback for each transport block of the plurality of transport blocks. In some examples, the transport block repetition component 830 may determine whether receipt of a latest transport block of the plurality of transport blocks satisfies the timing capability of the second UE. In some examples, the transport block repetition component 830 may transmit the sidelink data transmission via a plurality of transport blocks.

In some cases, each of the plurality of transport blocks is associated with a corresponding feedback transmission. In some cases, the first timing gap is based on a latest transport block of the plurality of transport blocks. The transmitting UE feedback component 850 may receive the feedback transmission from the second UE. In some examples, the transmitting UE feedback component 850 may identify an uplink control channel resource based on the downlink control information.

In some examples, the transmitting UE feedback component 850 may determine whether a second timing gap between receipt of the feedback transmission at the first UE and the uplink control channel resource satisfies a timing capability of the first UE. In some examples, the transmitting UE feedback component 850 may transmit, to the base station, an uplink control channel transmission on the uplink control channel resource based on the second timing gap satisfying the timing capability of the first UE or detecting an error event for the uplink control channel transmission based on the second timing gap failing to satisfy the timing capability of the first UE. In some cases, the timing capability of the first UE is based on a minimum processing time at the first UE for decoding the feedback transmission and preparing the uplink control channel transmission. The multi-receiver sidelink communications component 855 may transmit the sidelink data transmission to a plurality of UEs.

In some examples, the multi-receiver sidelink communications component 855 may receive a plurality of feedback transmissions from the plurality of UEs. In some examples, the multi-receiver sidelink communications component 855 may identify an uplink control channel resource based on the downlink control information. In some examples, the multi-receiver sidelink communications component 855 may determine whether a second timing gap between receipt of a latest feedback transmission of the plurality of feedback transmissions at the first UE and the uplink control channel resource satisfies a timing capability of the first UE. In some examples, the multi-receiver sidelink communications component 855 may transmit, to the base station, an uplink control channel transmission on the uplink control channel resource based on the second timing gap satisfying the timing capability of the first UE or detecting an error event for the uplink control channel transmission based on the second timing gap failing to satisfy the timing capability of the first UE.

In some examples, the multi-receiver sidelink communications component 855 may receive a first plurality of feedback transmissions from a first plurality of the plurality of UEs on a first feedback channel resource. In some examples, the multi-receiver sidelink communications component 855 may receive a second plurality of feedback transmissions from a second plurality of the plurality of UEs on a second feedback channel resource, where the second feedback channel resource is different from the first feedback channel resource.

In some examples, the multi-receiver sidelink communications component 855 may receive the plurality of feedback transmissions from the plurality of UEs within a timing window, where a size of the timing window is based on the respective timing capabilities of the plurality of UEs. In some examples, the multi-receiver sidelink communications component 855 may determine, for each of the plurality of feedback transmissions, whether a respective second timing gap between receipt of a respective feedback transmission at the first UE and the uplink control channel resource satisfies a timing capability of the first UE.

In some examples, the multi-receiver sidelink communications component 855 may transmit, to the base station, an uplink control channel transmission on the uplink control channel resource for a first plurality of the plurality of feedback transmissions based on the second timing gap for the first plurality satisfying the timing capability of the first UE, or detecting an error event for a second plurality of the plurality of feedback transmissions based on the second timing gap for the second plurality failing to satisfy the timing capability of the first UE, or both. In some examples, the multi-receiver sidelink communications component 855 may drop respective acknowledgments for the second plurality of the plurality of feedback transmissions in the uplink control channel transmission. In some examples, the multi-receiver sidelink communications component 855 may identify an additional uplink control channel resource based on detecting the error event for the second plurality of the plurality of feedback transmissions.

In some examples, the multi-receiver sidelink communications component 855 may transmit, to the base station, an additional uplink control channel transmission on the additional uplink control channel resource including acknowledgments for the second plurality of the plurality of feedback transmissions. In some cases, the plurality of feedback transmissions from the plurality of UEs are transmitted on a same feedback channel resource.

Figure 9:
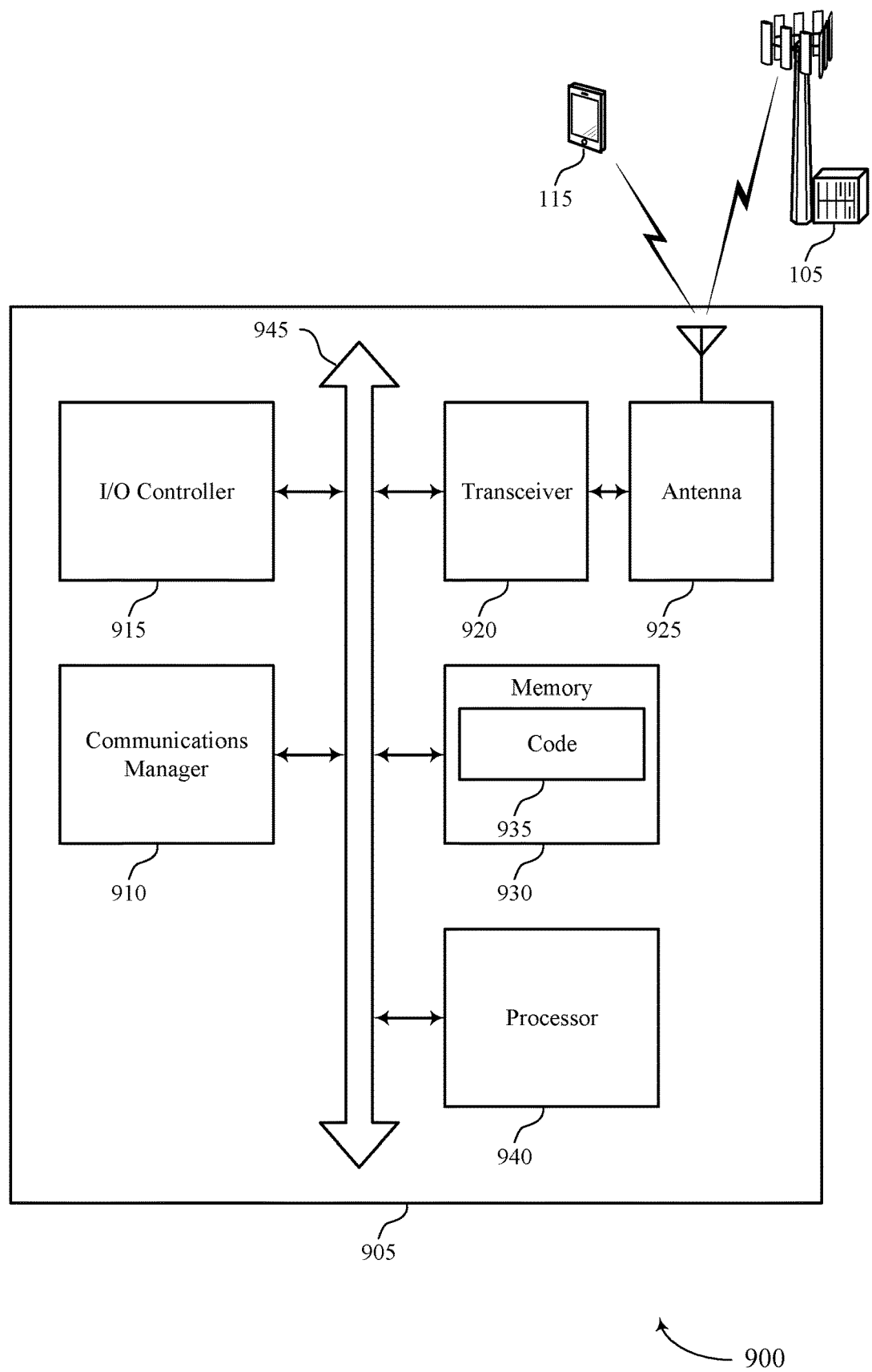
FIG. 9 shows a diagram of a system including a device that supports timing conditions for sidelink feedback reporting in accordance with aspects of the present disclosure.

FIG. 9 shows a diagram of a system 900 including a device 905 that supports timing conditions for sidelink feedback reporting in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a first UE, sidelink control information scheduling a sidelink data transmission and feedback associated with the sidelink data transmission, identify, at a second UE, a timing gap based on a timing capability of the second UE, the timing gap configured between a receipt of the scheduled sidelink data transmission to the second UE and the feedback from the second UE, determine whether the timing gap configured between the receipt of the sidelink data transmission at the second UE and the feedback from the second UE satisfies the timing capability of the second UE, and transmit the feedback based on the timing gap satisfying the timing capability or detecting an error event for the feedback based on the timing gap failing to satisfy the timing capability. The communications manager 910 may also receive, at a first UE, downlink control information from a base station scheduling a second UE for a sidelink data transmission via a sidelink data channel, transmit, to the second UE via a sidelink control channel, sidelink control information scheduling the sidelink data transmission to the second UE and a feedback transmission from the second UE, where a first timing gap is configured between receipt of the sidelink data transmission at the second UE and the feedback transmission from the second UE that is based on a timing capability of the second UE, and transmit the sidelink data transmission to the second UE via the sidelink data channel.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting timing conditions for sidelink feedback reporting).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
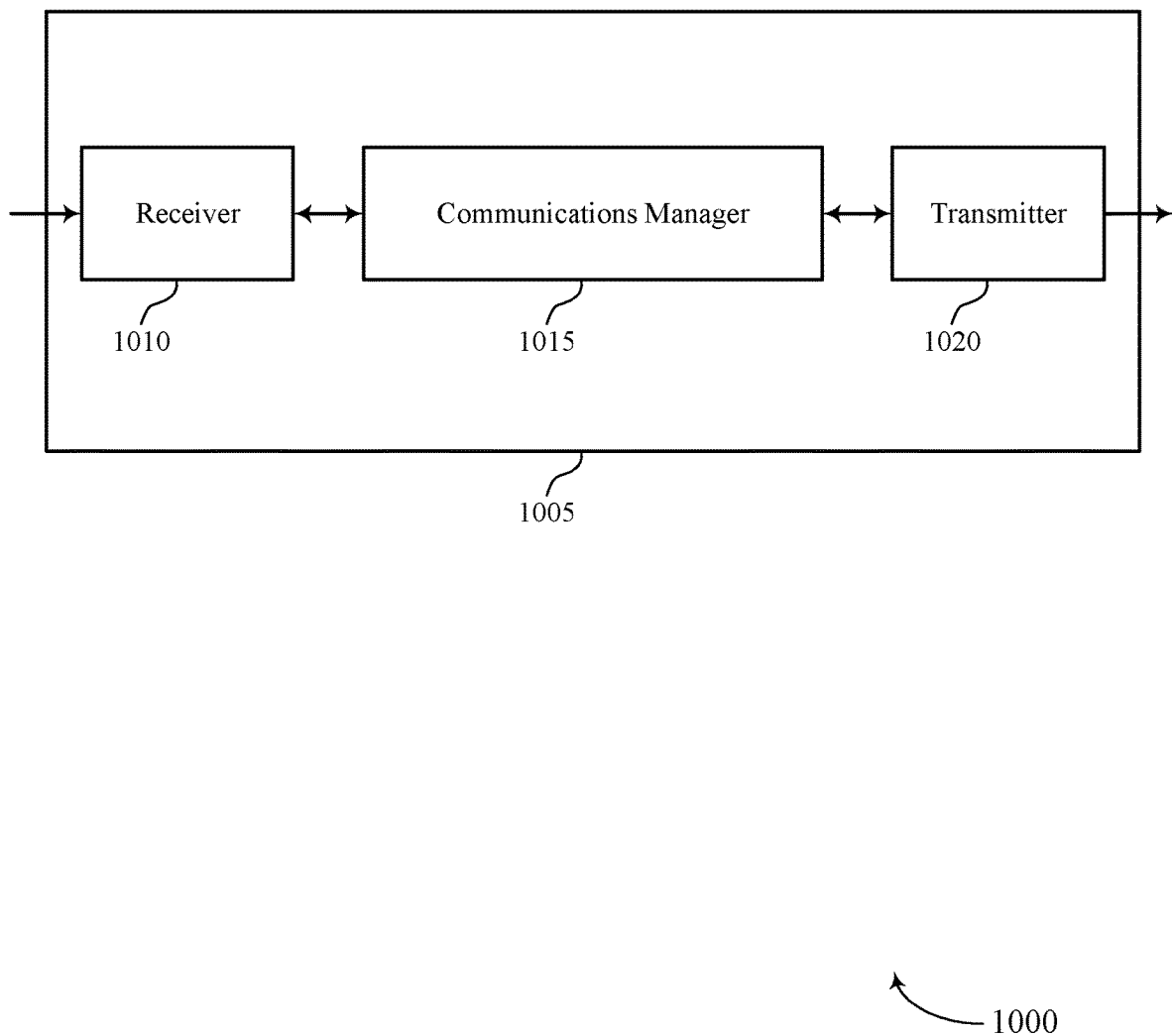
FIGS. 10 and 11 show block diagrams of devices that support timing conditions for sidelink feedback reporting in accordance with aspects of the present disclosure.

FIG. 10 shows a block diagram 1000 of a device 1005 that supports timing conditions for sidelink feedback reporting in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to timing conditions for sidelink feedback reporting, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a first timing capability for a first UE based on a first timing gap between receipt of a downlink control information transmission at the first UE and the first UE preparing a sidelink data transmission, identify a second timing capability for a second UE based on a second timing gap between receipt of the sidelink data transmission at the second UE and a feedback transmission from the second UE, transmit, to the first UE, downlink control information scheduling the second UE for the sidelink data transmission, where the downlink control information schedules feedback associated with the sidelink data transmission based on the first timing capability and the second timing capability, and monitor for feedback associated with the sidelink data transmission. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
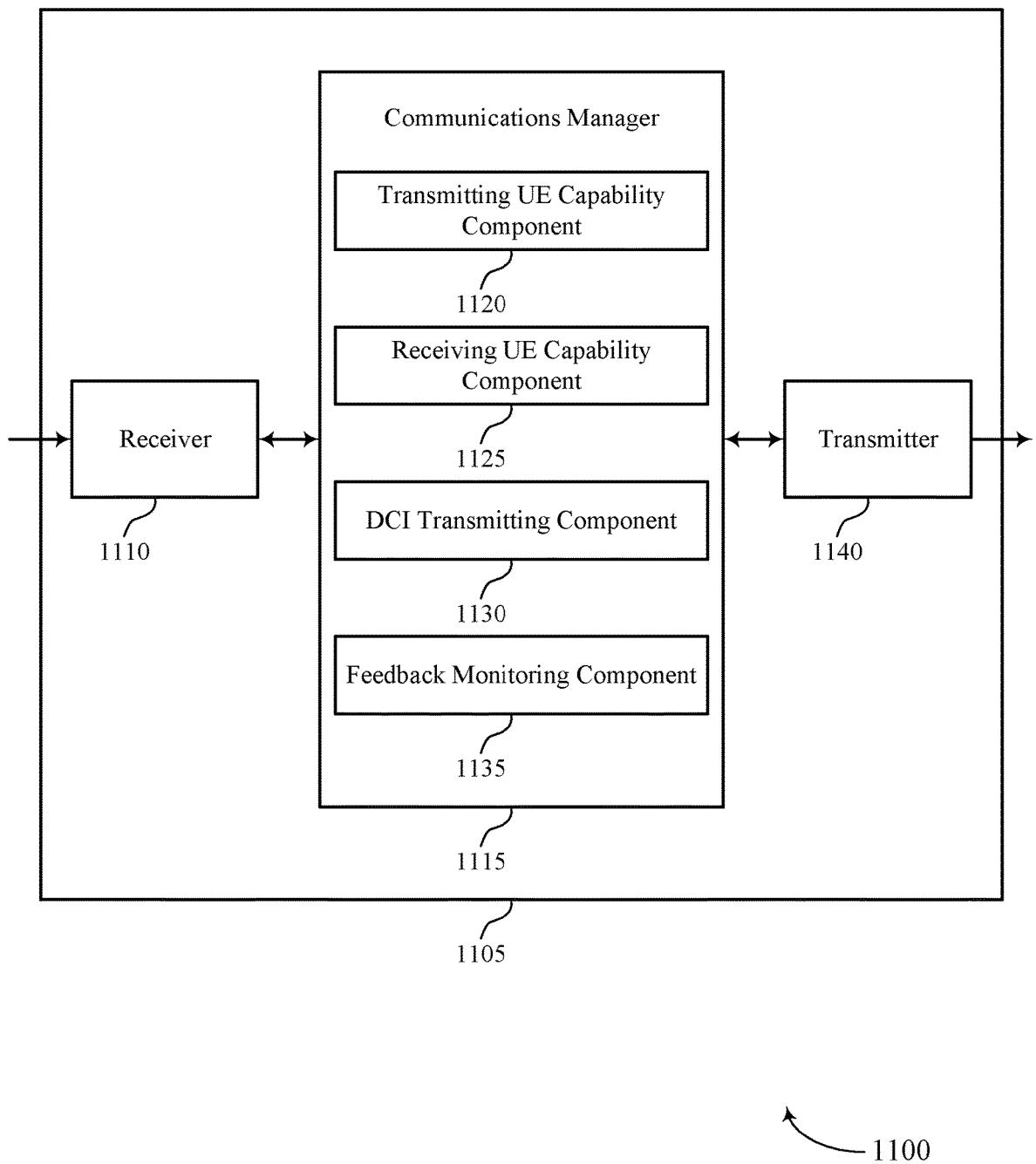

FIG. 11 shows a block diagram 1100 of a device 1105 that supports timing conditions for sidelink feedback reporting in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to timing conditions for sidelink feedback reporting, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a transmitting UE capability component 1120, a receiving UE capability component 1125, a DCI transmitting component 1130, and a feedback monitoring component 1135. The communications manager 1115 may be an example of aspects of the communications manager 1310 described herein.

The transmitting UE capability component 1120 may identify a first timing capability for a first UE based on a first timing gap between receipt of a downlink control information transmission at the first UE and the first UE preparing a sidelink data transmission.

The receiving UE capability component 1125 may identify a second timing capability for a second UE based on a second timing gap between receipt of the sidelink data transmission at the second UE and a feedback transmission from the second UE.

The DCI transmitting component 1130 may transmit, to the first UE, downlink control information scheduling the second UE for the sidelink data transmission, where the downlink control information schedules feedback associated with the sidelink data transmission based on the first timing capability and the second timing capability.

The feedback monitoring component 1135 may monitor for feedback associated with the sidelink data transmission.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
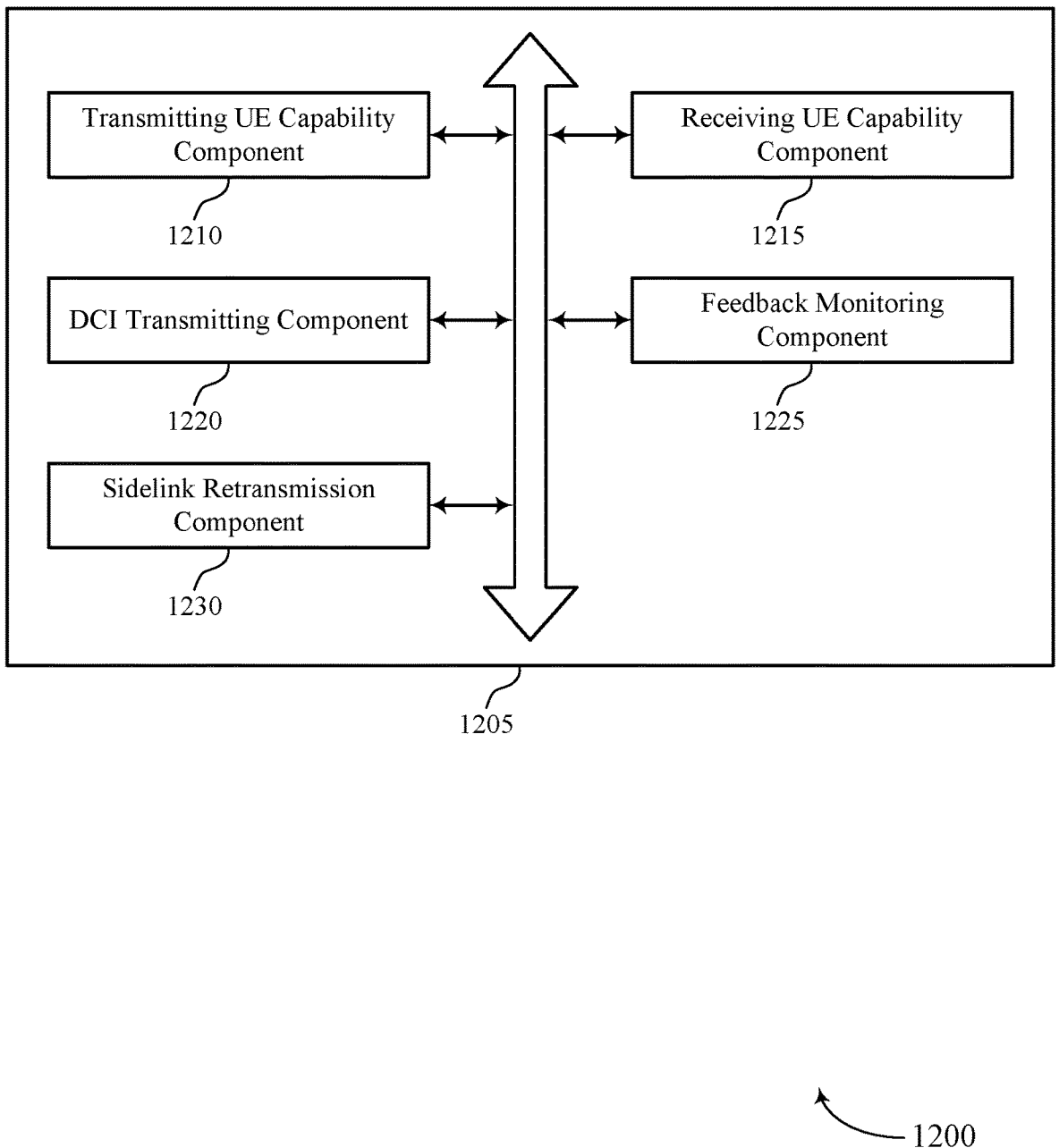
FIG. 12 shows a block diagram of a communications manager that supports timing conditions for sidelink feedback reporting in accordance with aspects of the present disclosure.

FIG. 12 shows a block diagram 1200 of a communications manager 1205 that supports timing conditions for sidelink feedback reporting in accordance with aspects of the present disclosure. The communications manager 1205 may be an example of aspects of a communications manager 1015, a communications manager 1115, or a communications manager 1310 described herein. The communications manager 1205 may include a transmitting UE capability component 1210, a receiving UE capability component 1215, a DCI transmitting component 1220, a feedback monitoring component 1225, and a sidelink retransmission component 1230. Each of these modules may communicate, directly or indirectly, with one another (e.g., via one or more buses).

The transmitting UE capability component 1210 may identify a first timing capability for a first UE based on a first timing gap between receipt of a downlink control information transmission at the first UE and the first UE preparing a sidelink data transmission.

In some examples, the transmitting UE capability component 1210 may identify a third timing capability for the first UE based on a third timing gap between the first UE decoding a sidelink feedback channel and the first UE preparing an uplink control channel, where the feedback transmission is further based on the third timing capability.

In some examples, the transmitting UE capability component 1210 may receive, from the first UE, the feedback transmission associated with the sidelink data transmission on the uplink control channel.

The receiving UE capability component 1215 may identify a second timing capability for a second UE based on a second timing gap between receipt of the sidelink data transmission at the second UE and a feedback transmission from the second UE.

The DCI transmitting component 1220 may transmit, to the first UE, downlink control information scheduling the second UE for the sidelink data transmission, where the downlink control information schedules feedback associated with the sidelink data transmission based on the first timing capability and the second timing capability.

The feedback monitoring component 1225 may monitor for feedback associated with the sidelink data transmission.

In some examples, the feedback monitoring component 1225 may receive, from the second UE, the feedback transmission associated with the sidelink data transmission.

In some cases, the feedback transmission includes a plurality of feedback bits corresponding to a plurality of sidelink data transmissions from the first UE to a plurality of UEs.

The sidelink retransmission component 1230 may receive an indication that a feedback transmission from the first UE did not satisfy the first timing capability.

In some examples, the sidelink retransmission component 1230 may transmit, to the first UE, an indication of an additional uplink control channel resource.

In some examples, the sidelink retransmission component 1230 may monitor for a retransmission of at least a portion of the feedback transmission from the first UE.

Figure 13:
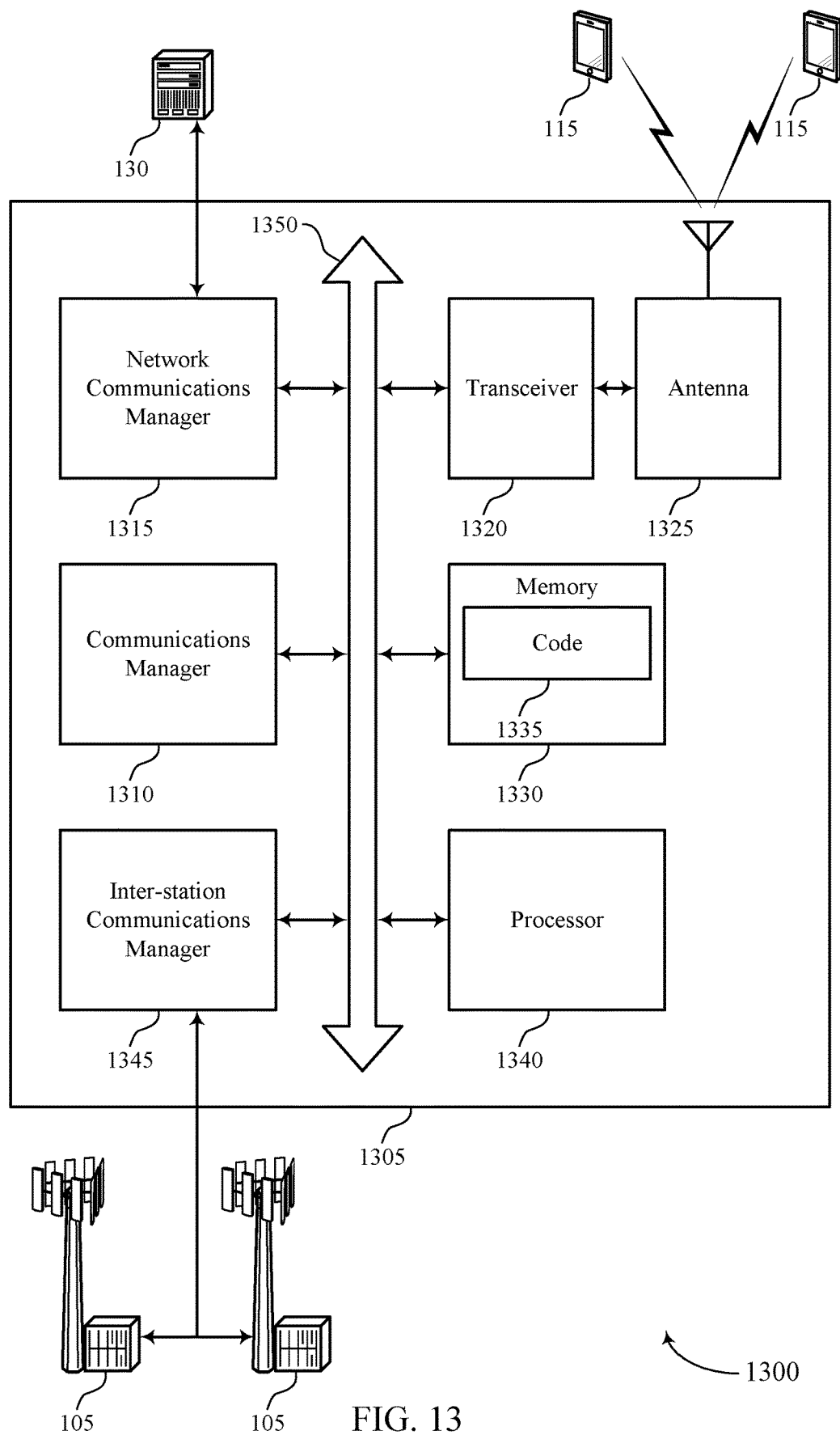
FIG. 13 shows a diagram of a system including a device that supports timing conditions for sidelink feedback reporting in accordance with aspects of the present disclosure.

FIG. 13 shows a diagram of a system 1300 including a device 1305 that supports timing conditions for sidelink feedback reporting in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify a first timing capability for a first UE based on a first timing gap between receipt of a downlink control information transmission at the first UE and the first UE preparing a sidelink data transmission, identify a second timing capability for a second UE based on a second timing gap between receipt of the sidelink data transmission at the second UE and a feedback transmission from the second UE, transmit, to the first UE, downlink control information scheduling the second UE for the sidelink data transmission, where the downlink control information schedules feedback associated with the sidelink data transmission based on the first timing capability and the second timing capability, and monitor for feedback associated with the sidelink data transmission.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting timing conditions for sidelink feedback reporting).

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
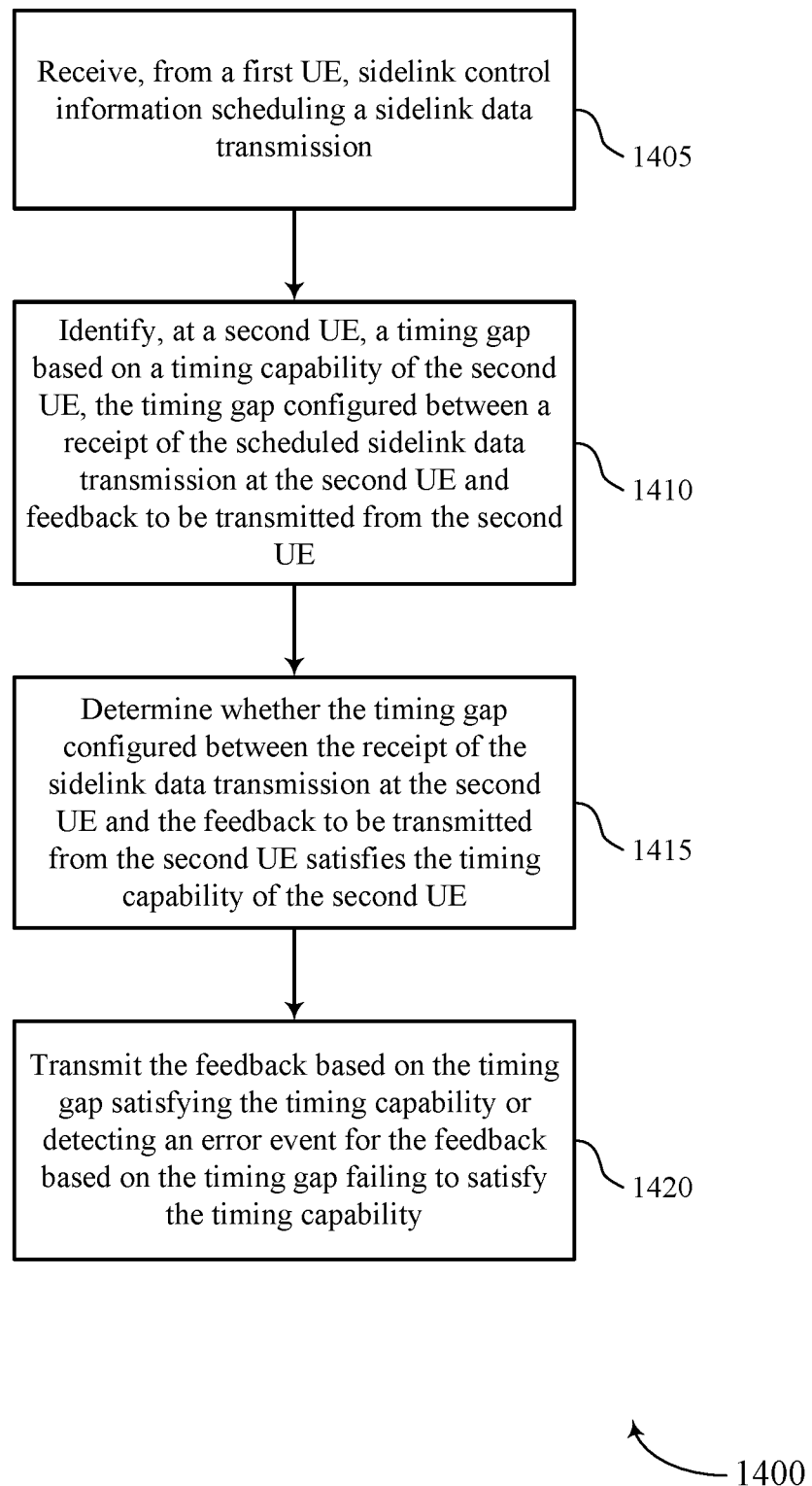
FIGS. 14 through 18 show flowcharts illustrating methods that support timing conditions for sidelink feedback reporting in accordance with aspects of the present disclosure.

FIG. 14 shows a flowchart illustrating a method 1400 that supports timing conditions for sidelink feedback reporting in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a first UE, sidelink control information scheduling a sidelink data transmission. The operations of 1405 may be performed according to the methods described herein. In some examples, aspects of the operations of 1405 may be performed by a SCI receiving component as described with reference to FIGS. 6 through 9.

At 1410, the UE may identify, at a second UE, a timing gap based on a timing capability of the second UE, the timing gap configured between a receipt of the scheduled sidelink data transmission at the second UE and feedback to be transmitted from the second UE. The operations of 1410 may be performed according to the methods described herein. In some examples, aspects of the operations of 1410 may be performed by a receiving UE time gap component as described with reference to FIGS. 6 through 9.

At 1415, the UE may determine whether the timing gap configured between the receipt of the sidelink data transmission at the second UE and the feedback to be transmitted from the second UE satisfies the timing capability of the second UE. The operations of 1415 may be performed according to the methods described herein. In some examples, aspects of the operations of 1415 may be performed by a receiving UE capability component as described with reference to FIGS. 6 through 9.

At 1420, the UE may transmit the feedback based on the timing gap satisfying the timing capability or detecting an error event for the feedback based on the timing gap failing to satisfy the timing capability. The operations of 1420 may be performed according to the methods described herein. In some examples, aspects of the operations of 1420 may be performed by a receiving UE feedback component as described with reference to FIGS. 6 through 9.

Figure 15:
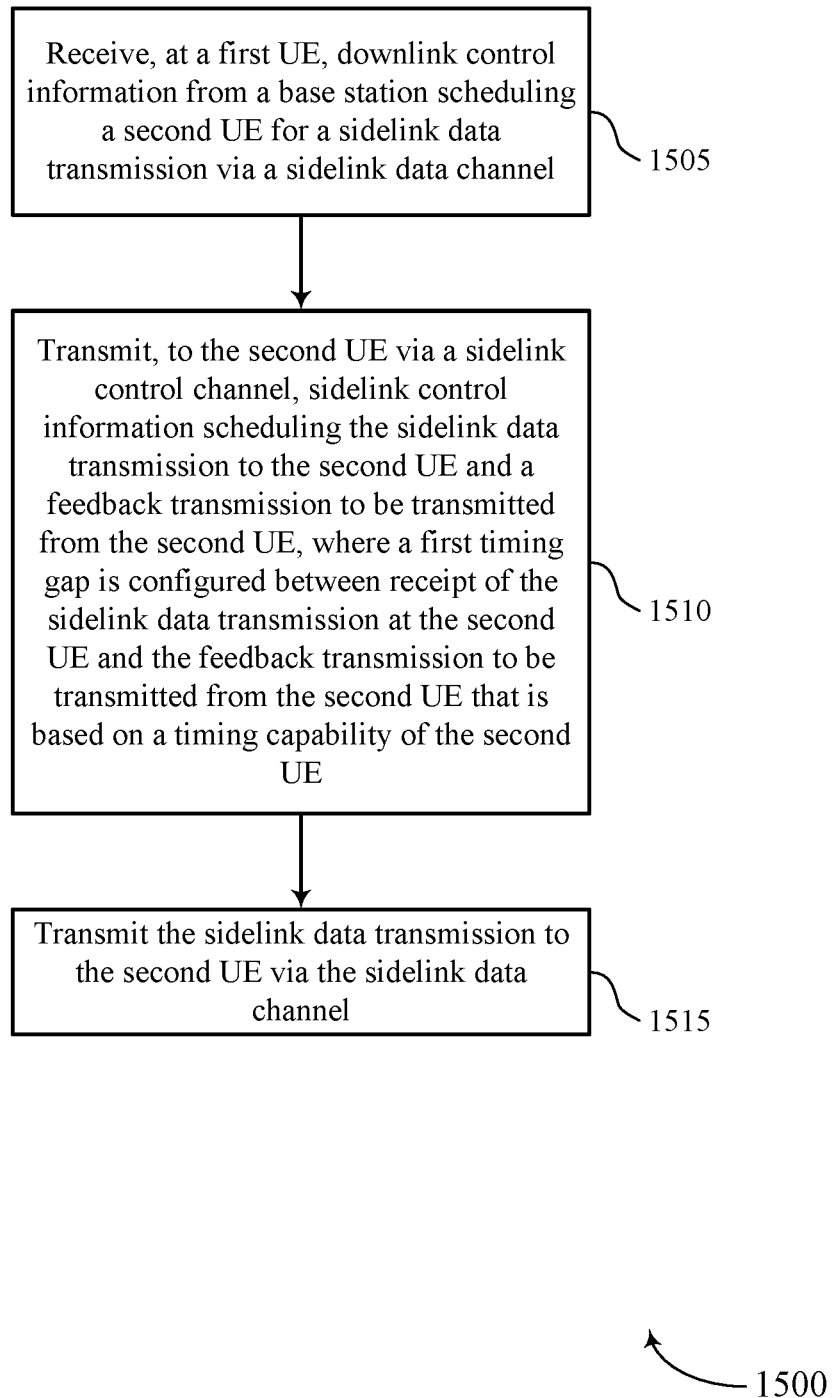

FIG. 15 shows a flowchart illustrating a method 1500 that supports timing conditions for sidelink feedback reporting in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, at a first UE, downlink control information from a base station scheduling a second UE for a sidelink data transmission via a sidelink data channel. The operations of 1505 may be performed according to the methods described herein. In some examples, aspects of the operations of 1505 may be performed by a DCI receiving component as described with reference to FIGS. 6 through 9.

At 1510, the UE may transmit, to the second UE via a sidelink control channel, sidelink control information scheduling the sidelink data transmission to the second UE and a feedback transmission to be transmitted from the second UE, where a first timing gap is configured between receipt of the sidelink data transmission at the second UE and the feedback transmission from the second UE that is based on a timing capability of the second UE. The operations of 1510 may be performed according to the methods described herein. In some examples, aspects of the operations of 1510 may be performed by a SCI transmitting component as described with reference to FIGS. 6 through 9.

At 1515, the UE may transmit the sidelink data transmission to the second UE via the sidelink data channel. The operations of 1515 may be performed according to the methods described herein. In some examples, aspects of the operations of 1515 may be performed by a sidelink data transmitting component as described with reference to FIGS. 6 through 9.

Figure 16:
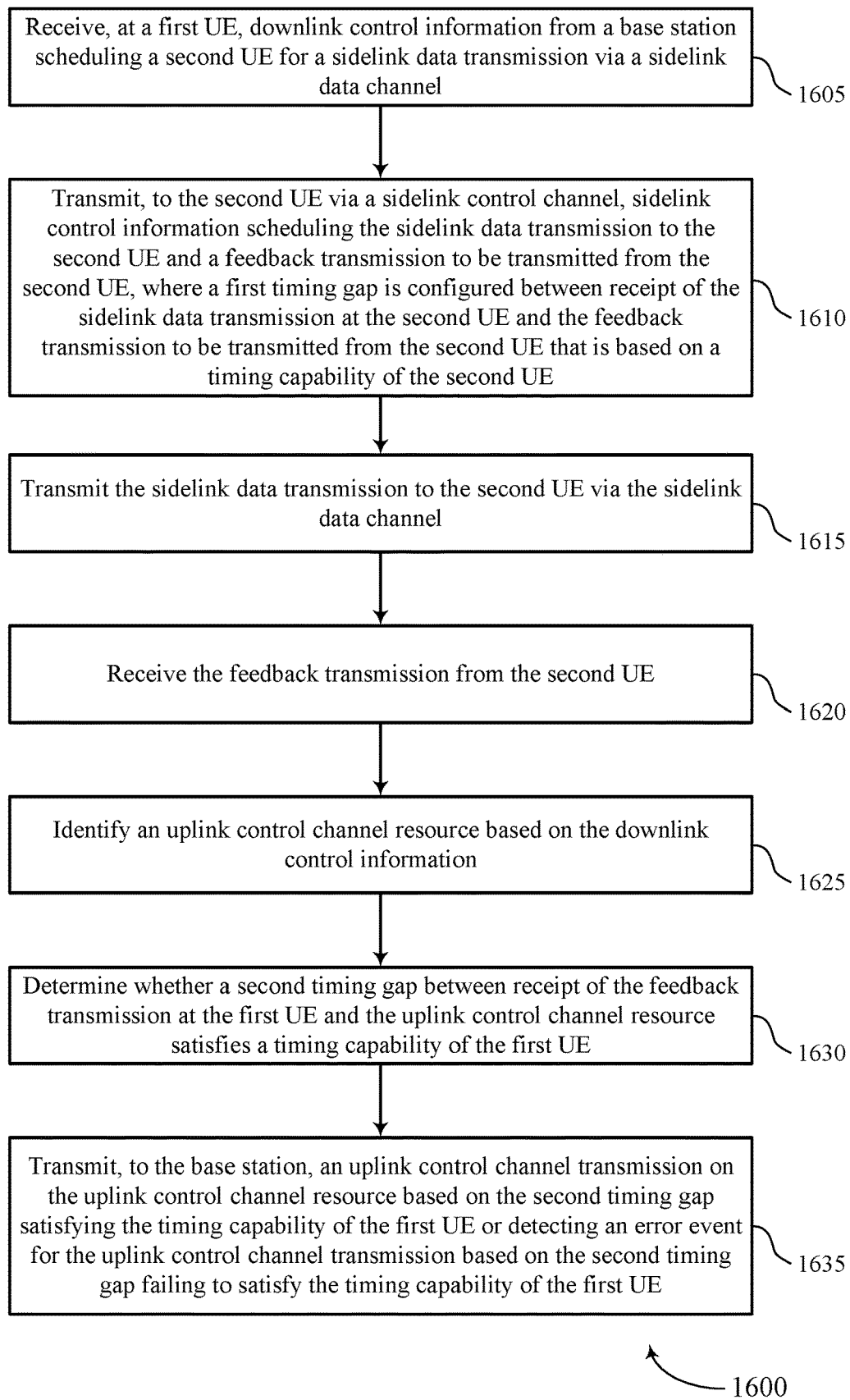

FIG. 16 shows a flowchart illustrating a method 1600 that supports timing conditions for sidelink feedback reporting in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, at a first UE, downlink control information from a base station scheduling a second UE for a sidelink data transmission via a sidelink data channel. The operations of 1605 may be performed according to the methods described herein. In some examples, aspects of the operations of 1605 may be performed by a DCI receiving component as described with reference to FIGS. 6 through 9.

At 1610, the UE may transmit, to the second UE via a sidelink control channel, sidelink control information scheduling the sidelink data transmission to the second UE and a feedback transmission to be transmitted from the second UE, where a first timing gap is configured between receipt of the sidelink data transmission at the second UE and the feedback transmission to be transmitted from the second UE that is based on a timing capability of the second UE. The operations of 1610 may be performed according to the methods described herein. In some examples, aspects of the operations of 1610 may be performed by a SCI transmitting component as described with reference to FIGS. 6 through 9.

At 1615, the UE may transmit the sidelink data transmission to the second UE via the sidelink data channel. The operations of 1615 may be performed according to the methods described herein. In some examples, aspects of the operations of 1615 may be performed by a sidelink data transmitting component as described with reference to FIGS. 6 through 9.

At 1620, the UE may receive the feedback transmission from the second UE. The operations of 1620 may be performed according to the methods described herein. In some examples, aspects of the operations of 1620 may be performed by a transmitting UE feedback component as described with reference to FIGS. 6 through 9.

At 1625, the UE may identify an uplink control channel resource based on the downlink control information. The operations of 1625 may be performed according to the methods described herein. In some examples, aspects of the operations of 1625 may be performed by a transmitting UE feedback component as described with reference to FIGS. 6 through 9.

At 1630, the UE may determine whether a second timing gap between receipt of the feedback transmission at the first UE and the uplink control channel resource satisfies a timing capability of the first UE. The operations of 1630 may be performed according to the methods described herein. In some examples, aspects of the operations of 1630 may be performed by a transmitting UE feedback component as described with reference to FIGS. 6 through 9.

At 1635, the UE may transmit, to the base station, an uplink control channel transmission on the uplink control channel resource based on the second timing gap satisfying the timing capability of the first UE or detecting an error event for the uplink control channel transmission based on the second timing gap failing to satisfy the timing capability of the first UE. The operations of 1635 may be performed according to the methods described herein. In some examples, aspects of the operations of 1635 may be performed by a transmitting UE feedback component as described with reference to FIGS. 6 through 9.

Figure 17:
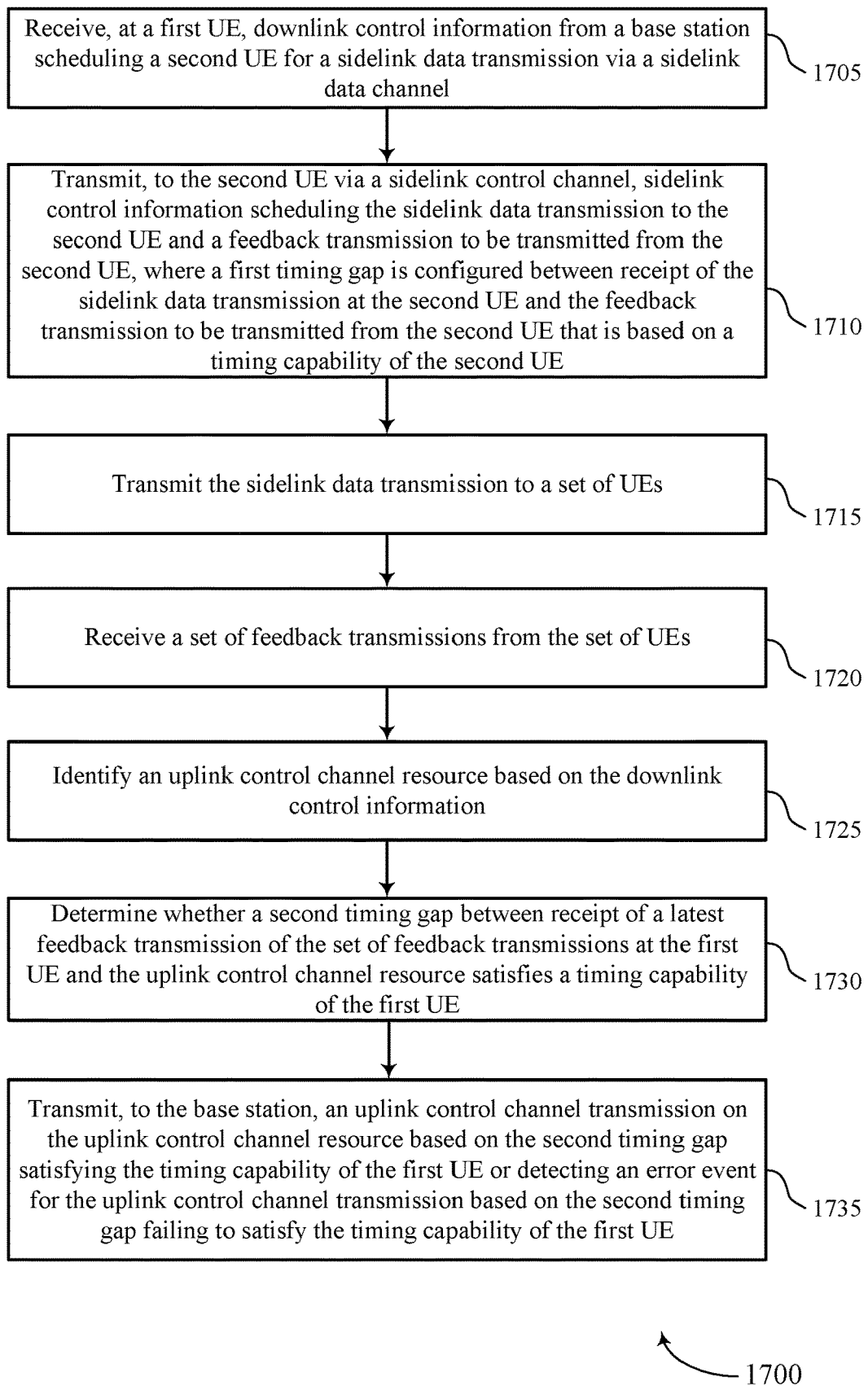

FIG. 17 shows a flowchart illustrating a method 1700 that supports timing conditions for sidelink feedback reporting in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive, at a first UE, downlink control information from a base station scheduling a second UE for a sidelink data transmission via a sidelink data channel. The operations of 1705 may be performed according to the methods described herein. In some examples, aspects of the operations of 1705 may be performed by a DCI receiving component as described with reference to FIGS. 6 through 9.

At 1710, the UE may transmit, to the second UE via a sidelink control channel, sidelink control information scheduling the sidelink data transmission to the second UE and a feedback transmission to be transmitted from the second UE, where a first timing gap is configured between receipt of the sidelink data transmission at the second UE and the feedback transmission to be transmitted from the second UE that is based on a timing capability of the second UE. The operations of 1710 may be performed according to the methods described herein. In some examples, aspects of the operations of 1710 may be performed by a SCI transmitting component as described with reference to FIGS. 6 through 9.

At 1715, the UE may transmit the sidelink data transmission to a plurality of UEs. The operations of 1715 may be performed according to the methods described herein. In some examples, aspects of the operations of 1715 may be performed by a multi-receiver sidelink communications component as described with reference to FIGS. 6 through 9.

At 1720, the UE may receive a plurality of feedback transmissions from the plurality of UEs. The operations of 1720 may be performed according to the methods described herein. In some examples, aspects of the operations of 1720 may be performed by a multi-receiver sidelink communications component as described with reference to FIGS. 6 through 9.

At 1725, the UE may identify an uplink control channel resource based on the downlink control information. The operations of 1725 may be performed according to the methods described herein. In some examples, aspects of the operations of 1725 may be performed by a multi-receiver sidelink communications component as described with reference to FIGS. 6 through 9.

At 1730, the UE may determine whether a second timing gap between receipt of a latest feedback transmission of the plurality of feedback transmissions at the first UE and the uplink control channel resource satisfies a timing capability of the first UE. The operations of 1730 may be performed according to the methods described herein. In some examples, aspects of the operations of 1730 may be performed by a multi-receiver sidelink communications component as described with reference to FIGS. 6 through 9.

At 1735, the UE may transmit, to the base station, an uplink control channel transmission on the uplink control channel resource based on the second timing gap satisfying the timing capability of the first UE or detecting an error event for the uplink control channel transmission based on the second timing gap failing to satisfy the timing capability of the first UE. The operations of 1735 may be performed according to the methods described herein. In some examples, aspects of the operations of 1735 may be performed by a multi-receiver sidelink communications component as described with reference to FIGS. 6 through 9.

Figure 18:
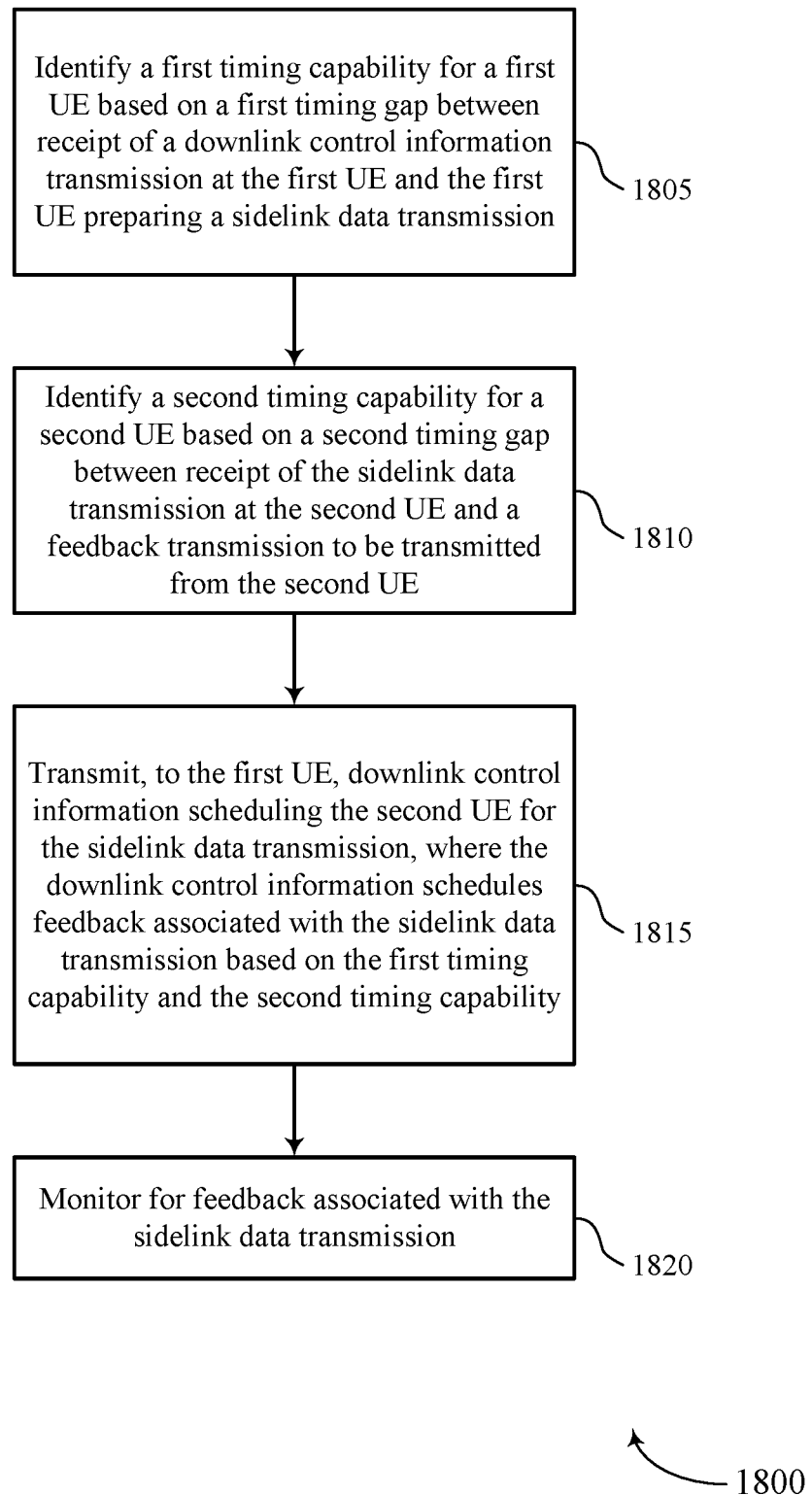

FIG. 18 shows a flowchart illustrating a method 1800 that supports timing conditions for sidelink feedback reporting in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may identify a first timing capability for a first UE based on a first timing gap between receipt of a downlink control information transmission at the first UE and the first UE preparing a sidelink data transmission. The operations of 1805 may be performed according to the methods described herein. In some examples, aspects of the operations of 1805 may be performed by a transmitting UE capability component as described with reference to FIGS. 10 through 13.

At 1810, the base station may identify a second timing capability for a second UE based on a second timing gap between receipt of the sidelink data transmission at the second UE and a feedback transmission to be transmitted from the second UE. The operations of 1810 may be performed according to the methods described herein. In some examples, aspects of the operations of 1810 may be performed by a receiving UE capability component as described with reference to FIGS. 10 through 13.

At 1815, the base station may transmit, to the first UE, downlink control information scheduling the second UE for the sidelink data transmission, where the downlink control information schedules feedback associated with the sidelink data transmission based on the first timing capability and the second timing capability. The operations of 1815 may be performed according to the methods described herein. In some examples, aspects of the operations of 1815 may be performed by a DCI transmitting component as described with reference to FIGS. 10 through 13.

At 1820, the base station may monitor for feedback associated with the sidelink data transmission. The operations of 1820 may be performed according to the methods described herein. In some examples, aspects of the operations of 1820 may be performed by a feedback monitoring component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a second user equipment (UE), comprising:
   receiving, from a first UE, sidelink control information scheduling a sidelink data transmission and a feedback transmission associated with the sidelink data transmission based at least in part on a timing capability of the second UE, wherein the sidelink control information configures a timing gap in accordance with the timing capability of the second UE, the timing gap comprising a minimum time duration between receipt of the sidelink data transmission at the second UE and the feedback transmission to be transmitted from the second UE; and
   transmitting the feedback transmission based at least in part on the timing gap satisfying the timing capability or detecting an error event for the feedback transmission based at least in part on the timing gap failing to satisfy the timing capability.

2. The method of claim 1, wherein transmitting the feedback transmission further comprises:
   transmitting the feedback transmission to the first UE.

3. The method of claim 2, further comprising:
   identifying a resource for transmitting the feedback transmission based at least in part on the second UE being associated with a group of UEs.

4. The method of claim 1, wherein transmitting the feedback transmission further comprises:
   transmitting the feedback transmission to a network device on a physical uplink control channel.

5. The method of claim 1, wherein the timing capability of the second UE is based at least in part on a minimum processing time at the second UE for a downlink shared channel.

6. The method of claim 1, wherein receiving the sidelink data transmission comprises:
   receiving the sidelink data transmission via a plurality of transport blocks.

7. The method of claim 6, further comprising:
   transmitting corresponding feedback for each transport block of the plurality of transport blocks.

8. The method of claim 6, further comprising:
   determining whether receipt of a latest transport block of the plurality of transport blocks satisfies the timing capability of the second UE.

9. The method of claim 1, further comprising:
   receiving an indication that an acknowledgment to a network device corresponding to the feedback transmission has been dropped.

10. The method of claim 1, further comprising:
    receiving an indication that an acknowledgment to a network device corresponding to the feedback transmission is to be transmitted by the first UE in a later uplink control channel transmission.

11. A method for wireless communications, comprising:
    receiving, at a first user equipment (UE), downlink control information from a network device scheduling a second UE for a sidelink data transmission via a sidelink data channel;
    transmitting, to the second UE via a sidelink control channel, sidelink control information scheduling the sidelink data transmission to the second UE and a feedback transmission to be transmitted from the second UE based at least in part on a timing capability of the second UE, wherein the sidelink control information configures a first timing gap in accordance with the timing capability of the second UE, the first timing gap comprising a minimum time duration between receipt of the sidelink data transmission at the second UE and the feedback transmission to be transmitted from the second UE; and
    transmitting the sidelink data transmission to the second UE via the sidelink data channel.

12. The method of claim 11, further comprising:
    receiving the feedback transmission from the second UE;
    identifying an uplink control channel resource based at least in part on the downlink control information;
    determining whether a second timing gap configured between receipt of the feedback transmission at the first UE and the uplink control channel resource satisfies a timing capability of the first UE; and
    transmitting, to the network device, an uplink control channel transmission on the uplink control channel resource based at least in part on the second timing gap satisfying the timing capability of the first UE or identifying an error event for the uplink control channel transmission based at least in part on the second timing gap failing to satisfy the timing capability of the first UE.

13. The method of claim 12, wherein the timing capability of the first UE is based at least in part on a minimum processing time at the first UE for decoding the feedback transmission and preparing the uplink control channel transmission.

14. The method of claim 11, wherein the timing capability of the second UE is based at least in part on a minimum processing time at the second UE for a downlink shared channel.

15. The method of claim 11, wherein transmitting the sidelink data transmission further comprises:
   transmitting the sidelink data transmission to a plurality of UEs;
   receiving a plurality of feedback transmissions from the plurality of UEs;
   identifying an uplink control channel resource based at least in part on the downlink control information;
   determining whether a second timing gap configured between receipt of a latest feedback transmission of the plurality of feedback transmissions at the first UE and the uplink control channel resource satisfies a timing capability of the first UE; and
   transmitting, to the network device, an uplink control channel transmission on the uplink control channel resource based at least in part on the second timing gap satisfying the timing capability of the first UE or identifying an error event for the uplink control channel transmission based at least in part on the second timing gap failing to satisfy the timing capability of the first UE.

16. The method of claim 15, wherein the plurality of feedback transmissions from the plurality of UEs are transmitted on a same feedback channel resource.

17. The method of claim 15, wherein receiving the plurality of feedback transmissions further comprises:
   receiving a first set of feedback transmissions from a first set of the plurality of UEs on a first feedback channel resource; and
   receiving a second set of feedback transmissions from a second set of the plurality of UEs on a second feedback channel resource, wherein the second feedback channel resource is different from the first feedback channel resource.

18. The method of claim 15, further comprising:
   receiving the plurality of feedback transmissions from the plurality of UEs within a timing window, wherein a size of the timing window is based at least in part on the respective timing capabilities of the plurality of UEs.

19. The method of claim 11, wherein transmitting the sidelink data transmission further comprises:
   transmitting the sidelink data transmission to a plurality of UEs;
   receiving a plurality of feedback transmissions from the plurality of UEs;
   identifying an uplink control channel resource based at least in part on the downlink control information;
   determining, for each of the plurality of feedback transmissions, whether a respective second timing gap configured between receipt of a respective feedback transmission at the first UE and the uplink control channel resource satisfies a timing capability of the first UE; and
   transmitting, to the network device, an uplink control channel transmission on the uplink control channel resource for a first set of the plurality of feedback transmissions based at least in part on the second timing gap for the first set satisfying the timing capability of the first UE, or identifying an error event for a second set of the plurality of feedback transmissions based at least in part on the second timing gap for the second set failing to satisfy the timing capability of the first UE, or both.

20. The method of claim 19, further comprising:
   dropping respective acknowledgments for the second set of the plurality of feedback transmissions in the uplink control channel transmission.

21. The method of claim 19, further comprising:
   identifying an additional uplink control channel resource based at least in part on detecting the error event for the second set of the plurality of feedback transmissions; and
   transmitting, to the network device, an additional uplink control channel transmission on the additional uplink control channel resource comprising acknowledgments for the second set of the plurality of feedback transmissions.

22. The method of claim 11, wherein transmitting the sidelink data transmission comprises:
   transmitting the sidelink data transmission via a plurality of transport blocks.

23. The method of claim 22, wherein each of the plurality of transport blocks is associated with a corresponding feedback transmission.

24. The method of claim 22, wherein the first timing gap is based at least in part on a latest transport block of the plurality of transport blocks.

25. A method for wireless communications, comprising:
   configuring a first timing gap between receipt of a downlink control information transmission at a first user equipment (UE) and the first UE preparing a sidelink data transmission, the first timing gap being configured based at least in part on a first timing capability for the first UE;
   configuring a second timing gap between receipt of the sidelink data transmission at a second UE and a feedback transmission to be transmitted from the second UE, the second timing gap being configured based at least in part on a second timing capability for the second UE based;
   transmitting, to the first UE, downlink control information scheduling the second UE for the sidelink data transmission, wherein the downlink control information schedules feedback associated with the sidelink data transmission based at least in part on the first timing capability and the second timing capability; and
   monitoring for feedback associated with the sidelink data transmission.

26. The method of claim 25, further comprising:
   identifying a third timing capability for the first UE based at least in part on a third timing gap between the first UE decoding a sidelink feedback channel and the first UE preparing an uplink control channel, wherein the feedback transmission is further based at least in part on the third timing capability; and
   receiving, from the first UE, the feedback transmission associated with the sidelink data transmission on the uplink control channel.

27. The method of claim 25, further comprising:
   receiving an indication that a feedback transmission from the first UE did not satisfy the first timing capability;
   transmitting, to the first UE, an indication of an additional uplink control channel resource; and
   monitoring for a retransmission of at least a portion of the feedback transmission from the first UE.

28. The method of claim 25, further comprising:
   receiving, from the second UE, the feedback transmission associated with the sidelink data transmission.

29. The method of claim 25, wherein the feedback transmission comprises a plurality of feedback bits corresponding to a plurality of sidelink data transmissions from the first UE to a plurality of UEs.

30. An apparatus for wireless communication at a second user equipment (UE), comprising:
- a processor; and
- memory in electronic communication with the processor, the memory comprising instructions executable by the processor to cause the apparatus to:
  - receive, from a first UE, sidelink control information scheduling a sidelink data transmission and a feedback transmission associated with the sidelink data transmission based at least in part on a timing capability of the second UE, wherein the sidelink control information configures a timing gap in accordance with the timing capability of the second UE, the timing gap comprising a minimum time duration between receipt of the sidelink data transmission at the second UE and the feedback transmission to be transmitted from the second UE; and
  - transmit the feedback transmission based at least in part on the timing gap satisfying the timing capability or detecting an error event for the feedback transmission based at least in part on the timing gap failing to satisfy the timing capability.

* * * * *